US012635835B2

(12) United States Patent
Graham et al.

(10) Patent No.: US 12,635,835 B2
(45) Date of Patent: May 26, 2026

(54) APPARATUS WITH TRANSFER BOARD

(71) Applicants: QUA, INC., New Rochelle, NY (US); UNIVERSITY OF PITTSBURGH—OF THE COMMONWEALTH SYSTEM OF HIGHER EDUCATION, Pittsburgh, PA (US); UNITED STATES GOVERNMENT AS REPRESENTED BY THE DEPARTMENT OF VETERANS AFFAIRS, Washington, DC (US)

(72) Inventors: Margaret Graham, New York, NY (US); Paul Carlson, Skaneateles, NY (US); Teresa Boynton, Loveland, CO (US); Alicia Koontz, Pittsburgh, PA (US); Garrett Grindle, Pittsburgh, PA (US)

(73) Assignees: QUA, INC., New Rochelle, NY (US); UNIVERSITY OF PITTSBURGH—OF THE COMMONWEALTH SYSTEM OF HIGHER EDUCATION, Pittsburgh, PA (US); UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 0 days.

(21) Appl. No.: 19/342,848

(22) Filed: Sep. 29, 2025

(65) Prior Publication Data

US 2026/0041290 A1 Feb. 12, 2026

Related U.S. Application Data

(63) Continuation of application No. PCT/US2025/022674, filed on Apr. 2, 2025.

(Continued)

(51) Int. Cl.
*A47K 13/00* (2006.01)
*A61G 7/10* (2006.01)

(52) U.S. Cl.
CPC .......... *A47K 13/005* (2013.01); *A61G 7/1007* (2013.01); *A61G 7/103* (2013.01)

(58) Field of Classification Search
CPC ..... A47K 13/005; A61G 7/1007; A61G 7/103
See application file for complete search history.

(56) References Cited

U.S. PATENT DOCUMENTS 5,145,771 A * 9/1992 Lemasters .............. A01N 1/126
530/331
5,384,920 A 1/1995 Havens (Continued)

FOREIGN PATENT DOCUMENTS

KR 10-2022-087876 12/2020

OTHER PUBLICATIONS

International Searching Authority, International Search Report, PCT 2025/022674, Jul. 9, 2025.

(Continued)

*Primary Examiner* — Janie M Loeppke
(74) *Attorney, Agent, or Firm* — Dorf Nelson & Zauderer LLP; Scott D. Locke, Esq.

(57) ABSTRACT

An apparatus for transferring to a commode or other seat is provided. Through the use of a transfer board that is both easily moveable between a storage position and in use position and readily stabilized, a user may independently, or with the assistance of a caregiver, be able to access a (Continued)

commode or other seat from a bed or wheelchair that is powered or manual and that is with or without an elevating seat or other position.

19 Claims, 14 Drawing Sheets

Related U.S. Application Data

(60) Provisional application No. 63/680,144, filed on Aug. 7, 2024.

(56) References Cited

U.S. PATENT DOCUMENTS

| | | | | |
|---|---|---|---|---|
| 6,721,966 | B2 * | 4/2004 | Costonde | A61G 7/1044 4/560.1 |
| 7,562,400 | B2 | 7/2009 | Graham | |
| 8,490,224 | B2 | 7/2013 | Al-Jafar | |
| 9,357,890 | B2 | 6/2016 | Morris | |
| 9,775,753 | B2 * | 10/2017 | Johnson | A61G 5/00 |
| 10,219,959 | B1 | 3/2019 | Phillips | |
| 10,874,564 | B2 | 12/2020 | Splane et al. | |
| 10,939,785 | B2 | 3/2021 | Hart et al. | |
| 10,980,691 | B1 | 4/2021 | Sverdlik et al. | |
| 11,759,064 | B1 | 9/2023 | Calzarretta et al. | |
| 2007/0089227 | A1 | 4/2007 | Battiston | |
| 2008/0141446 | A1 * | 6/2008 | Dupuis | A47K 17/02 4/254 |
| 2010/0175184 | A1 | 7/2010 | Cervi | |
| 2014/0230142 | A1 * | 8/2014 | Baker | A61G 5/14 4/667 |
| 2015/0272797 | A1 | 10/2015 | Hines | |
| 2017/0056267 | A1 | 3/2017 | Stryker et al. | |
| 2018/0193214 | A1 | 7/2018 | Johnson et al. | |
| 2019/0350411 | A1 | 11/2019 | Hart et al. | |
| 2024/0292983 | A1 | 9/2024 | Calzaretta et al. | |

OTHER PUBLICATIONS

International Searching Authority, Written Opinion, PCT 2025/022674, Jul. 9, 2025.

Dignity Lifts, Deluxe Toilet Lift DL1, Internet printout https://dignitylifts.com/products/dignity-lifts-deluxe-toilet-lift?variant=38063801172154&currency=USD&utm_medium=product_sync&utm_source=google&utm_content=sag_organic&utm_campaign=sag_organic&utm_campaign=gs-2021-05-07&utm_source=google&utm_medium=smart_campaign&gad_source=1&gbraid=0AAAAABmSAdgxxzry30-q2zmJSzpXDR2Ag&gclid=CjwKCAjwnei0BhB-EiwAA2xuBk8iHQTOAZBONX_9JQRQ1TO6dASA-dMeytPaPNY7Ef3w9GNRiGY7CBoCFeAQAvD_BWE (14 pages), Aug. 1, 2024.

wrapponusa.com, Compact Waterless Toilet, Internet printout, (3 pages) Feb. 21, 2025.

Discoverymymobility.com, Bedside Commode Lift JT202OK, Internet printout https://www.discovermymobility.com/store/bathroomlifts/discover/bedside-commode-lift-jt-2020k/index.html?gad_source=1&gbraid=0AAAAADwxsMvKfFxtMYhpyfmQZb97RhgzX&gclid=CjwKCAjwnei0BhB-EiwAA2xuBppTerxbrG-DO1Ykh7a8szp3z-H5Zruf4QaDr_FaYAjgWcTateom6BoC2foQAvD_BWE, (4 pages) Aug. 1, 2024.

* cited by examiner

APPARATUS WITH TRANSFER BOARD

CROSS-REFERENCE TO RELATED APPLICATIONS

This application is a continuation application of international application number PCT/US2025/022674, filed Apr. 2, 2025, which claims priority to U.S. provisional Ser. No. 63/680,144 filed Aug. 7, 2024. The contents of these applications are incorporated herein by reference in their entirety.

GOVERNMENT RIGHTS

This invention was made with government support under Grant No. R44NR019516, awarded by the National Institutes of Health, Department of Health and Human Services. The U.S. government may have certain rights in this invention.

FIELD OF THE INVENTION

The present invention relates to the field of independent and dependent transfer to chairs, commodes, and other seats.

BACKGROUND OF THE INVENTION

Many people are left immobile or partially immobile for a time after surgery and/or medical treatment or due to an accident, medical condition, or aging. These individuals may be able to sit up in bed or function in a wheelchair but walking across a room to use the bathroom or to reach other items in their rooms is no longer possible, or if it is, it is a strenuous, hazardous, and/or painful activity. These challenges also apply to other individuals located anywhere along the continuum of care, including, but not limited to, individuals who are located in acute or sub-acute rehabilitation institutions, nursing homes, senior housing, or their own homes. Further, there are similar challenges for individuals who are ambulatory with or without a walker, a cane, or assistance from another person, but who are at risk for falling.

One option for this population is to use apparatuses that allow for independent or semi-independent transfer, such as the mobile commode described in U.S. Pat. No. 7,562,400. Among users'greatest concerns, when using these types of apparatuses, is their stability during the transfer process.

Additionally, a mobile commode may be used by a plurality of different individuals to transfer from beds and seating areas that are of different heights. Consequently, researchers have concerns as to how to design apparatuses with transfer boards that can accommodate different users, different seated surfaces, and different environments.

Various embodiments of the present invention are directed to one or both of these needs.

SUMMARY OF THE INVENTION

Various embodiments of the present invention provide apparatuses and methods for the transfer of persons from a first location, such as a bed, to a second location, such as a seat that is part of an apparatus, such as a commode that is mobile or fixed, or a wheelchair. Through the use of various embodiments of the present invention, users may efficiently transfer, or be transferred, to and from seats that are part of apparatuses that have one more transfer board(s) that is or are flexibly moved and sufficiently stable when in use.

According to a first embodiment, the present invention provides an apparatus for transfer to a seat. The apparatus comprises: (a) a base, wherein the base comprises a seat, wherein the seat has an upper surface and the upper surface of the seat has an outer edge; (b) a transfer board, wherein the transfer board has a first end and a second end, wherein the first end is proximate to the outer edge of the seat, and the transfer board is capable of being moved between an in use position and a storage position by rotating the transfer board relative to the upper surface of the seat at or near the first end of the transfer board, and the transfer board is attached (either directly or indirectly) to the base in both the in use position and the storage position; and (c) a stabilization mechanism, wherein the stabilization mechanism stabilizes the transfer board when the transfer board is in the in use position.

According to a second embodiment, the present invention provides a toilet seat with a lid. The toilet seat defines an opening, and the lid is configured to exist in a first position and a second position, wherein in the first position, the lid covers the opening of the seat or a portion thereof, and in the second position, the lid is folded on itself. In both the first position and the second position, either the lid is attached directly to the seat or both the lid and the seat are attached to the base. Optionally, the lid of this embodiment may be used with the apparatus of the first embodiment. In other embodiments, rather than folding, the lid may roll from the front to the rear. In still other embodiments one may use a lid that is hinged to a seat or a lid that is not attached to the seat directly but remains associated with the device through, for example, a cord or rope or other connecting structure.

According to a third embodiment, the present invention provides a mobile commode. The mobile commode comprises a seat, a base, a plurality of wheels, and a plurality of floor stabilizers. The apparatus may, for example, be configured to allow the wheels to move between an engaged position and a disengaged position. In the engaged position, the wheels contact a floor and in the disengaged position, the wheels do not contact a floor. The apparatus may also be configured to allow the floor stabilizers to move between a first position and a second position. When in the first position, the floor stabilizers contact the floor and when in the second position, the floor stabilizers do not contact the floor. Further, when the floor stabilizers are in the first position, the wheels may be in the disengaged position and when the floor stabilizers are in the second position, the wheels may be in the engaged position. Thus, in some embodiments, the wheels retract and the position of the floor stabilizers relative to floor changes while the size of the floor stabilizers does not change. Instead, the movement of the wheels, e.g., retraction causes the floor stabilizers to come into contact with the floor when the wheels break contact with the floor. In other embodiments, the wheels do not retract, but the floor stabilizers are capable of having their height change such that in one position they are in contact with the floor, while in another position, they are not in contact with the floor. In these embodiments, the system may be designed such that the wheels are not capable of losing contact with the floor, but force or friction caused by the floor stabilizers prevents movement of the wheels even when both the floor stabilizers and the wheels are in contact with the floor. Alternatively, the system may be designed such that the wheels are capable of losing contact with the floor when the floor stabilizers are extended and in contact with the floor. In still another embodiment, there may be leveling casters. Optionally when using leveling casters, there may be a break on one or more of the leveling casters (e.g., all leveling casters or only one or two of the rear casters) such as a foot break or a break controlled by a hand operated lever.

According to a fourth embodiment, the present invention provides a method of using an apparatus of the present invention. For example, the present invention may provide a method for transferring to a seat. This methods comprises: (a) moving a transfer board from a storage position to an in use position, wherein the transfer board is part of an apparatus, and the apparatus comprises, (i) a base, wherein the base comprises a seat, wherein the seat has an upper surface and the upper surface of the seat has an outer edge; (ii) the transfer board, wherein the transfer board has a first end and a second end, wherein the first end of the transfer board is proximate to the outer edge of the seat, and the transfer board is capable of rotating relative to the seat at or near the first end of the transfer board; and (iii) a stabilization mechanism, wherein the stabilization mechanism stabilizes the transfer board (e.g., holds it in place or prevents undesirable displacement), when the transfer board in use position; (b) causing a subject or oneself to move along the transfer board from the second end of the transfer board to the first end of the transfer board; and (c) causing the subject or oneself to move from the first end of the transfer board to the seat.

The present invention also provides a method for transferring off of the aforementioned seat. That method comprises: (a) causing a subject or oneself to move from a seat to a first end of a transfer board, wherein the transfer board is in an in use position and the transfer board is part of an apparatus, wherein the apparatus comprises, (i) a base, wherein the base comprises the seat, wherein the seat has an upper surface and the upper surface of the seat has an outer edge; (ii) the transfer board, wherein the transfer board has a first end and a second end, wherein the first end of the transfer board is proximate to the outer edge of the seat, and the transfer board is capable of rotating relative to the seat at or near the first end of the transfer board; and (iii) a stabilization mechanism, wherein the stabilization mechanism stabilizes the transfer board (e.g., holds it in place or prevents undesirable displacement), when the transfer board is in an in use position; (b) causing a subject or oneself to move along the transfer board from the first end of the transfer board to the second end of the transfer board; and (c) causing a subject or oneself to move off of the transfer board, e.g., onto a bed or another piece of furniture.

According to a fifth embodiment, the present invention provides a method of using a toilet seat with a lid of the present invention. The method may, for example, comprise unfolding a toilet seat lid that is associated with a toilet seat that defines an opening. The lid is configured to exist in a first position and a second position, wherein in the first position, the lid partially or completely covers an opening defined by the seat, and in the second position, in the lid is folded on itself, wherein in both the first position and the second position, the lid is attached directly to the seat or both the seat and the lid are attached to a base. After unfolding the lid, a user may position himself or herself on a seat, and after a user is no longer on the seat, the lid may be unfolded to cover the seat or the opening that it defines or a portion thereof.

According to a sixth embodiment, the present invention provides a method of using a mobile commode, wherein the mobile commode comprises a base, a seat, a plurality of wheels, and a plurality of floor stabilizers. The method may, for example, comprise moving the commode to a desired location by wheeling the commode, wherein during wheeling, the floor stabilizers are not in contact with floor and the wheels are in contact with the floor. The method may further comprise causing the floor stabilizers to come into contact with the floor. Optionally, the method also comprises causing the wheels to cease being in contact with the floor, thereby preventing movement of the apparatus. Also optionally, one may move a transfer board into a position for use, and then, a user may move or be moved along the transfer board and onto the seat.

According to a seventh embodiment, the present invention provides a mobile apparatus, wherein the mobile apparatus comprises a plurality of foot stabilizers and a plurality of wheels, wherein the apparatus is capable of being in a first position and a second position, wherein in the first position, the foot stabilizers are in contact with the floor and prevent movement of the apparatus. The apparatus may, for example, be a mobile commode, a wheelchair, or a stretcher.

Through the use of various embodiments of the present invention, one may efficiently and effectively enable a user to transfer to or from to a seat, such as a seat that is located on a mobile commode or wheelchair. The transfer may be independent, semi-independent with the assistance of a caregiver, or predominantly done by the caregiver. In various embodiments, one or more, if not all, of the following features are present: a transfer board that is attached to a unit such as a mobile commode; casters that are capable of locking; and an elevation feature that allows for lifting and lowering.

DETAILED DESCRIPTION

Reference will now be made in detail to various embodiments of the present invention, examples of which are illustrated in the accompanying figures. In the following description, numerous specific details are set forth in order to provide a thorough understanding of the present invention. However, unless otherwise indicated or implied from context, the details are intended to be examples and should not be deemed to limit the scope of the invention in any way. Additionally, features described in connection with the various or specific embodiments are not to be construed as inappropriate for use in connection with other embodiments disclosed herein, unless such exclusivity is explicitly stated or implied from context.

The terms "about" and "approximately" mean an acceptable error for a particular value as determined by one of ordinary skill in the art, which depends, in part, on how the value is measured or determined. In certain embodiments, the term "about" or "approximately" means within 1, 2, 3, or 4 standard deviations. In certain embodiments, the term "about" or "approximately" means within 30%, 20%, 15%, 10%, 9%, 8%, 7%, 6%, 5%, 4%, 3%, 2%, 1%, 0.5%, 0.1%, or 0.05%, of a given value or range.

Headers are provided for the convenience of the reader and do not limit the scope of any of the embodiments disclosed herein. Additionally, the figures are provided in order to facilitate the reader's understanding of the various embodiments of the present invention. However, they are not necessarily drawn to scale, and they do not limit the scope of the invention or any patent claims.

Apparatuses

In some embodiments, the present invention is directed to an apparatus for transferring a person to or from a seat or between seats. The apparatus itself may, for example, be a commode, a chair such as a wheelchair, or other device or furniture on which a person may sit or be transported such as a stretcher. When the apparatus is a commode, optionally, it is a mobile commode that is motorized and subject to remote control. In some embodiments, the commode is height adjustable by either or both of mechanical and motorized means. When the apparatus is a wheelchair, it can be manual or powered, e.g., electrically powered, and with or without an elevating seat. By way of a non-limiting example, an elevating seat is a seat that in its entirety may be raised or for which the rear portion is raised relative to the front.

In some embodiments, the apparatus comprises, consists essentially of, or consists of: a base, a transfer board, and a stabilization mechanism.

Base

Figure 4:
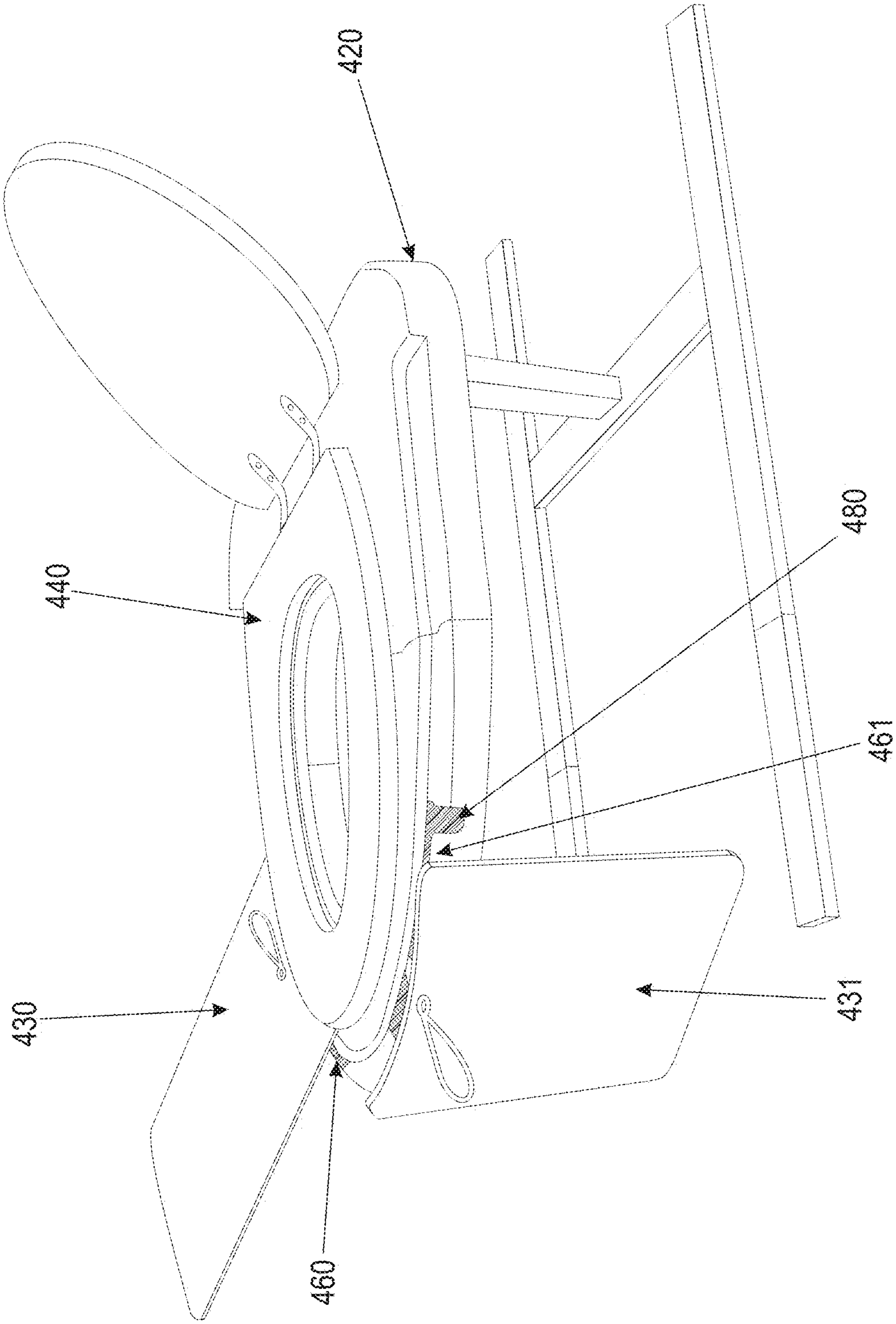
FIG. 4 is a stationary apparatus of the present invention with two transfer boards.

As shown in FIG. 4, the base 420 of the apparatus comprises a seat 440, which is the region on which a person may sit. When the apparatus is a commode, the seat may, for example, be a toilet seat. The seat may be a regular or irregular shape. For example, the horizontal cross-section of the seat may be a circle, an oval, or an ellipse, or substantially in the shape of a circle, an oval, or an ellipse with or without a gap.

The seat may, e.g., be a distinct structure that is attached to another portion of the base by, for example, a hinge. When there is a gap in a side of the seat, the gap may, for example, be centered approximately 180 degrees from the hinge and therefore be located at the front of the seat. The seat may, for example, define an opening in the base such that the apparatus can be used as a commode.

Figure 1:
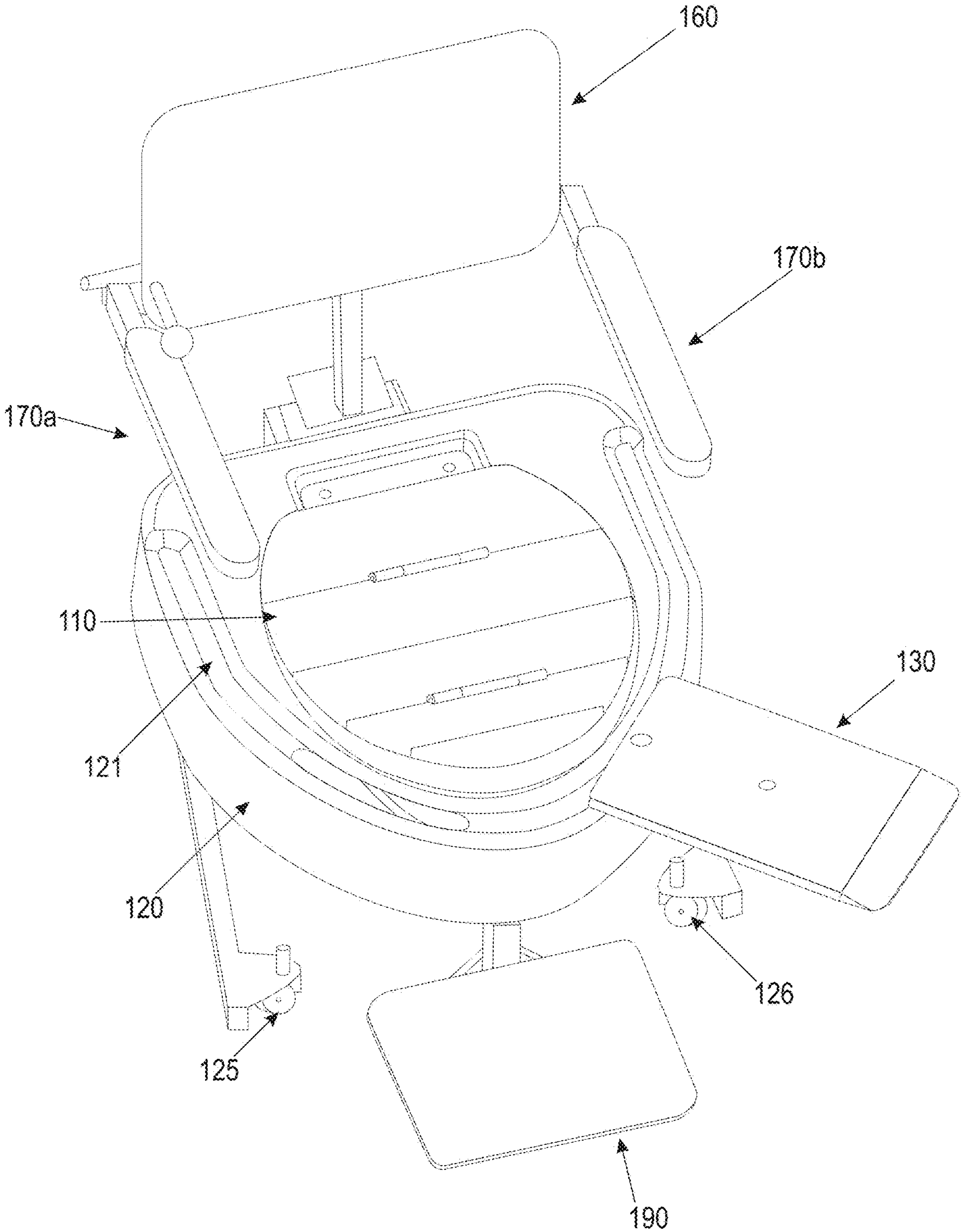
FIG. 1 is an apparatus of the present invention showing a transfer board in an in use position.

Optionally, as shown in FIG. 1, the base further comprises one or more or all of a back member 160, arms 170*a* and 170*b*, legs (not visible in FIG. 1), and wheels 125, 126 (and two or more other wheels, which are not visible in FIG. 1). Further, in some embodiments, there is a footrest 190.

Figure 13:
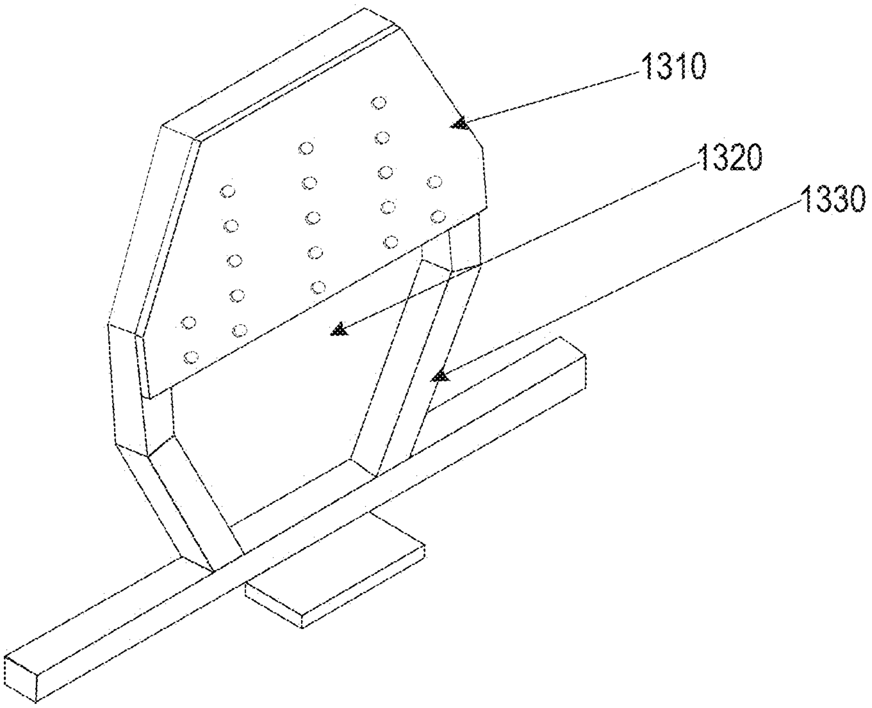
FIG. 13 shows a cushioned backrest.

The back member, if present, may comprise a rigid or semi-rigid or flexible structure or combination thereof that extends from and sits above the horizonal plane in which the seat resides. Thus, it may be located behind and optionally above the seat. In some embodiments, the back member is adjustable in height either manually or electronically. In some embodiments, the back member further comprises a beam or a "V" support 590 (in FIG. 5). In some embodiments, there is a solid backrest that optionally is cushioned and forms a front face of the back member and is connected to a housing of the base through a beam or V support. The backrest may form the complete front side of the back member or it may occupy only a portion of the back member, leaving an open space. For example, as shown in FIG. 13, the back member (which for illustrative purposes is shown detached from the apparatus) may comprise a cushion backrest 1310 that occupies between 25% and 75% or between 40% and 60% of the front face of the back member, e.g., the upper 25% and 75% or upper 40% and 60% of the front face of the back member. The inclusion of a space 1320 below the cushioning of the backrest is bound by a frame 1330 and may facilitate easy access to user from the rear.

The arms, if present, may be located perpendicular to the back member and optionally may be retractable or otherwise moveable so as to be a source for stability when a user is on the seat, while also may be capable of being in a location out of the way of the user when the user transfers onto or off of the seat. The arms, if moveable, may be designed to move independently of each other or in unison upward or downward or outward. In some embodiments, a hinge connects the arms to either the back member or to the seat. In some embodiments, the arms are fixed with a spring-loaded mechanism. They may, for example, be designed such that a user or caregiver can raise them slightly and as the arms are raised, they move outward and thus can pivot. By way of a non-limiting example, apparatus may be designed such that there are a pair of arms and each arm can pivot outward by 30 degrees to 90 degrees or 45 degrees to 60 degrees. Additionally or alternatively, they may each be able to pivot upward by 30 degrees to 90 degrees or 45 degrees to 60 degrees.

Wheels, if present, may, for example, be attached to the base, and optionally comprise a locking mechanism. In some embodiments, there are two sets of two or more wheels and each set of wheels is attached to a horizontal member. Thus, in each set of wheels, there may be a front wheel and a rear wheel.

In some embodiments, the base further comprises a housing. The housing may, for example, form a closed, partially closed, or open frame in which a receptacle for waste is located or to which the receptacle may be attached when the apparatus is a commode. If the housing is closed, then one side may have a window or a door through which a receptacle may be accessed, removed, and reinserted or replaced. Optionally, within the receptacle are chemicals for treating the waste and or absorbent pads. In some embodiments, the receptacle is a basin and is lined with a plastic bag that optionally contains chemicals.

Further, in some embodiments, within the basin, is a signal receiving unit, a signal-transmitting unit, an information storage unit, and a homing device finder. The information storage unit with the sensor can measure and or store information about the type and weight of the contents in the basin, what time the commode was used and other relevant information that may be of interest to a healthcare provider or caregiver, e.g., information for performing point-of-care testing (e.g., urinalysis, stool tests) and the results thereof. This information can be printed out on a slip to be added to a patient's chart, or it can be sent by the signal-transmitting unit to a main station where it may undergo data analysis before being sent to where a healthcare provider or caregiver can see it and optionally store it electronically.

In some embodiments, the housing and the seat are distinct structures, which may, for example, be attached by a hinge or other structure, while in other embodiments, the seat is a distinct structure that rests on the housing but is not attached to the housing. In other embodiments, the seat is an opening in an upper surface of a housing and not a distinct structure apart from e.g., the housing and instead is a region of the housing. In some embodiments, the upper surface of the housing has an opening and the seat is a discrete structure located at, or near, the perimeter of that opening, such that the opening defined by the seat is located either partially, or completely over, e.g., centered over, the opening of the upper surface of the housing. The opening in the seat may be larger than, smaller than, or the same size as the opening of the housing. When the openings are different sizes, there may, for example, be a difference in size of less than 20%, less than 15%, less than 10%, less than 5%, less than 4%, less than 3%, less than 2% or less than 1%.

Figure 3:
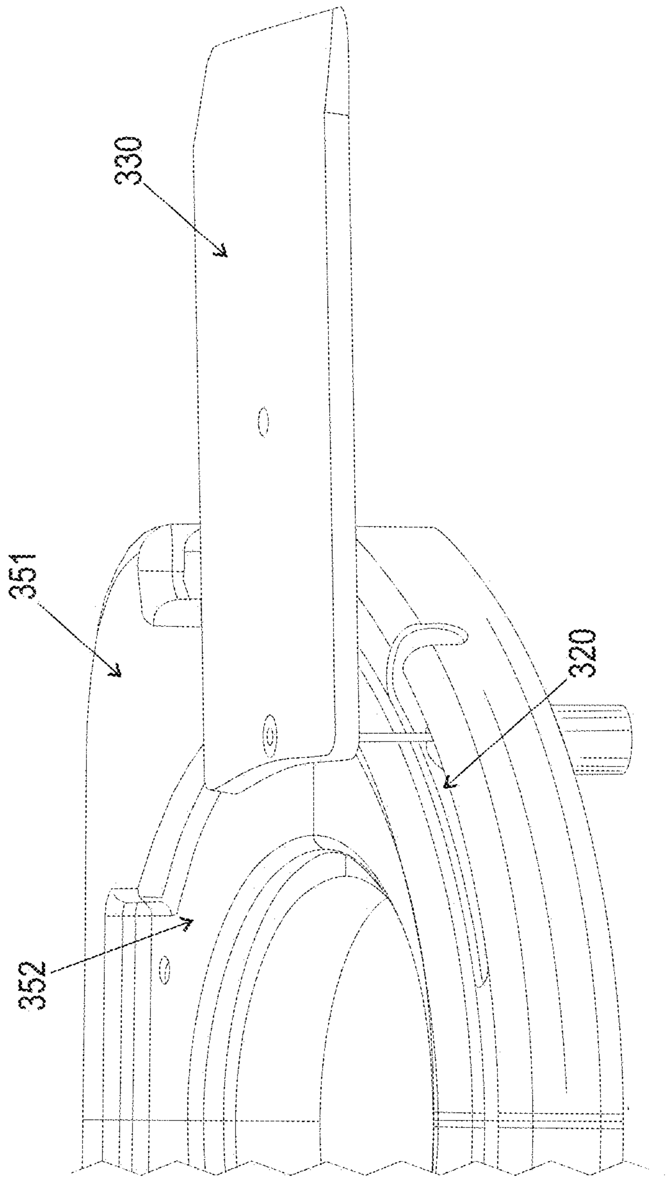
FIG. 3 is a transfer board of the present invention that is vertically higher than a base with a seat removed.

When the top of the seat rises above the upper surface of the housing (either partially or completely), the seat may be defined by its own upper surface, outer side walls and inner side walls. The outer perimeter of the upper surface of the seat forms an outer edge. In some embodiments, one or both of the outer edge and one or more regions of the outer side wall, if not the entire outer side wall of the seat, is or are convex. In some embodiments, the upper surface of the housing or a region of the housing forms a plane, and the lower surface of the seat abuts that plane. In other embodiments, as illustrated by FIG. 3, the upper surface 351 of the housing has a recessed inner rim 352, in which the seat (which for illustrative purposes is not shown) may sit so that a portion of the seat is beneath the plane of the upper surface of the housing, while a portion of the seat may or may not rise above that plane.

In some embodiments, the seat is hard or soft. In some embodiments, it comprises, consists essentially of, or consists of a hard or soft plastic. In other embodiments, the seat comprises, consists essentially of, or consists of a cushion material. In a non-limiting example, the seat comprises, consists essentially of, or consists of a hard foam that optionally is wrapped in soft vegan leather.

Transfer Board

The transfer board 130 (FIG. 1) is the portion of the apparatus that enables a user to move from a first location, such as a bed, to a second location, which is on the seat of the apparatus. The transfer board and its means for association with the other components of the apparatus imparts flexibility across various uses. The flexibility allows for ease of positioning and moving the transfer board relative to a user who may be situated on a rigid or semi-rigid structure. For example, the transfer board may be moved in any of a number of directions in three-dimensional space and positioned near, next to, or at its second end, under a user when the user seeks to move onto the transfer board toward a seat of the system. In some embodiments, this is accomplished through the use of tether at or near the first end of the transfer board.

Figure 11:
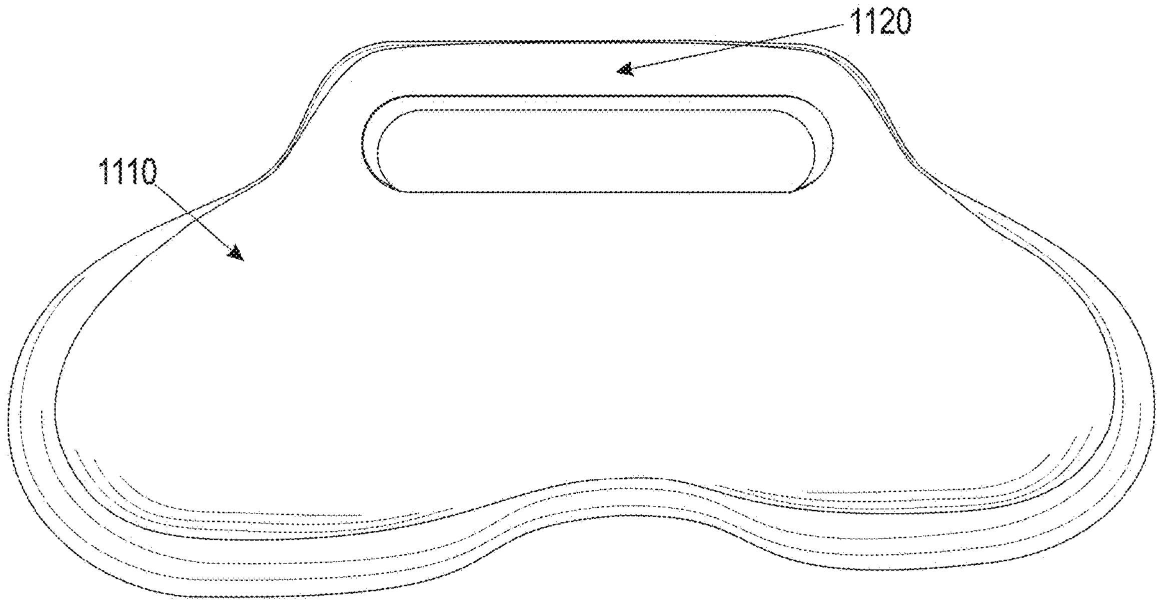
FIG. 11 is the top side of a transfer board with a rounded surface.
Figure 12:
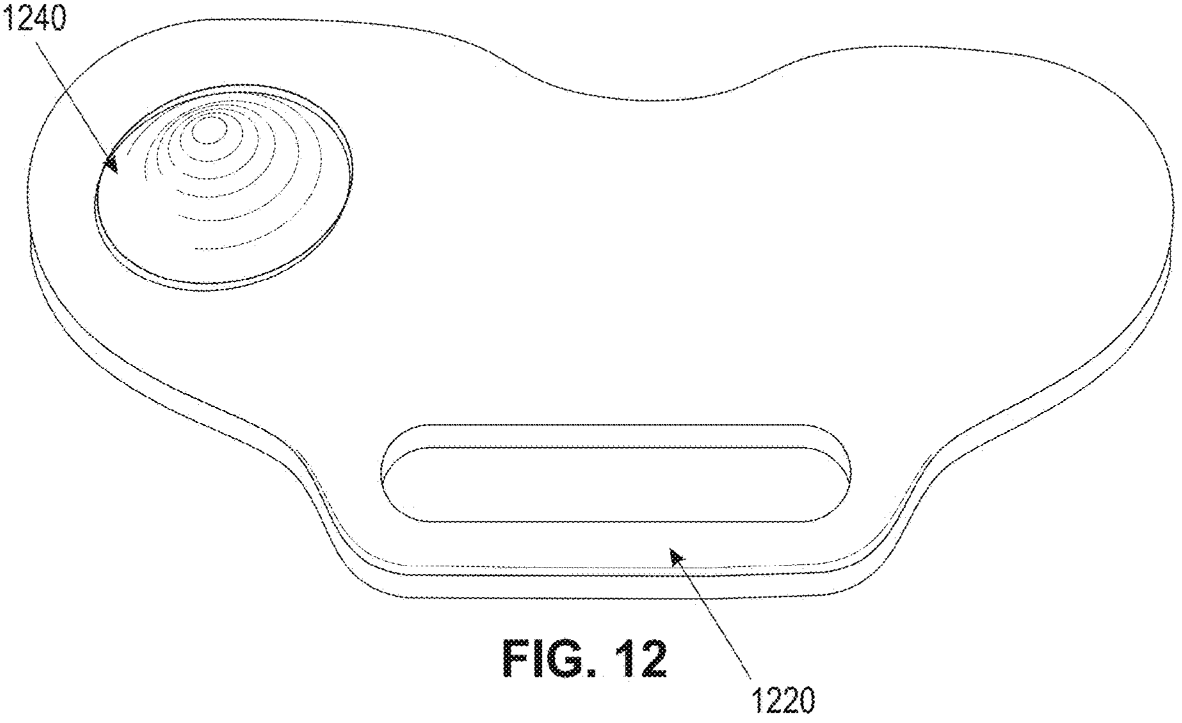
FIG. 12 is the bottom side of the transfer board of FIG. 11.

The transfer board may be any regular or irregular shape. For example, it may be rectangular or substantially rectangular with or without rounded side and optionally has tapered ends. Further, its surfaces may be smooth or contoured, and flat or rounded. When rounded, the top surface may have a concave region 1110 of FIG. 11 to direct the user as he or she slides along the transfer board. Regardless of whether the top side is rounded, the bottom side may be flat or curved and have a location for attachment of a stabilization mechanism 1240. Optionally, the transfer board has a handle 1120 (see also 1220 in FIG. 12) is which the handle is located on a side of the transfer board, i.e., at neither the first end nor the second end. In some embodiments, the transfer board comprises, consists essentially of, or consists of wood, metal, a metal alloy, plastic, or combinations thereof. In some embodiments, the transfer board is approximately 40 cm to 200 cm long or 50 cm to 100 cm long; approximately 20 cm to 100 cm wide or 25 cm to 50 cm wide; and approximately 2 cm to 6 cm thick or 3 cm to 5 cm thick.

At noted above, the transfer board has a first end and a second end. The first end is proximate to the outer edge of the seat, and the transfer board is capable of being moved between an in use position and a storage position relative to the upper surface of the seat at the first end of the transfer board. The transfer board may be attached, directly or indirectly, to the base in both the in use position and the storage position, through e.g., a tether. In some embodiments, the length of the transfer board from the first end to its second end is less than the distance between the upper surface of the base and the floor. When the apparatus is collapsible, in some embodiments, the length of the transfer board from the first end to its second end is less than the distance between the upper surface of the base and the floor, when the apparatus is collapsed. In some embodiments, one or both the outer edge and outer side wall of the transfer board proximate to the seat is or are concave.

In some embodiments, when the transfer board is in the in use position, the upper surface of the transfer board aligns with the upper surface of the seat, e.g., is at or near the outer edge of the seat. In some embodiments, the transfer board and the seat are designed such that the height of the seat, relative to the upper surface of a housing, is approximately the same as the thickness of the transfer board if the transfer board has a uniform thickness; or the thickness of the transfer board in the region of the transfer board at the first end of the transfer board, e.g., the first end of the transfer board and the seat may be coplanar. In some embodiments, the thickness of the transfer board may be between 10 mm greater than the height of the seat and 10 mm smaller than the height of the seat or between 5 mm greater than the height of the seat and 5 mm smaller than the height of the seat. Further, in some embodiments, there is no gap or there is a gap of less than 10 mm, or less than 5 mm, or less than 3 mm, or less than 2 mm between the outer side wall of the seat and the side wall of the first end of the transfer board when the transfer board is in use. Optionally, the edge of the transfer board proximate to the seat is concave and the outer edge of the seat is convex.

In some embodiments, the transfer board is tethered to the base, and optionally, there is no attachment to the base, other than the tether. The tethering system of the present invention allows for flexibility when using the apparatuses of various embodiments of the present invention. For example, it allows for easy placement and adjustment of the transfer board when a user or a caregiver positions the board for use.

Tethering may, for example, be through an opening in the upper surface of the base. For example, tethering may be at a location closer to the other edge of the upper surface of the base than to the opening over which the opening defined by the seat resides. This opening for tethering may, for example, be in the form of a cylindrical hole or a slot that is rectangular or in the form of a curve, such as an arc that follows at least a portion of the path of a curve, such as an arc of the outer edge of the seat. An arc may, for example, circumscribe and follow the path of a portion of, for example, a circle, an oval, or an ellipse. When the transfer board is tethered to the base, there may be no need for other association or attachment elements, and thus, in some embodiments, there is an absence of other elements, for example, there is no hinge to associate the transfer board 330 with the base. The slot 320, if present, may, for example, circumscribe a region near the right side of the seat or a region near the left side of the seat; a region near the front of the seat; a combination of a region near the left side of the seat and the front of the seat; a combination of a region near the right side of the seat and the front of the seat; or a region near the left side of the seat, the front side of the seat, and the right side of the seat. In some embodiments, the slot is a curve such as an arc that spans from 30 degrees to 150 degrees or from 60 degrees to 120 degrees around the seat or from 60 degrees to 90 degrees around the seat.

If the housing has side walls, in some embodiments, the upper surface of the housing may form a lip that protrudes. The opening for tethering may, e.g., be located in upper surface of the lip protrusion. In another embodiment, the housing 120 is wide enough that a slot 121, circumscribing a portion of the seat, is located in the upper surface of the housing and the housing has a side wall or side walls that obscure part or all of the tethering structure that is below the slot and any optionally any stabilization mechanism as well.

In some embodiments, the apparatus is designed such that the transfer board can move in one more if not all three of the following ways: rotation relative to the horizontal plane, vertically, and laterally. The ability to move the transfer board in one or more of these dimensions allows for flexible placement of the board at or near a user. In some embodiments, the apparatus itself can also move between a plurality of vertical positions such that either before or after the transfer board is placed at a desired location the seat of the apparatus is lower than the user to make use of gravity when the user moves onto the transfer board at its second end, moves along the transfer board and moves off of the transfer board at its first end and then onto the seat. Similarly, when the user wishes to leave the apparatus, the seat of the apparatus elevated and one can make use of gravity when the user moves onto the transfer board at its first end, moves along the transfer board, and moves off of the transfer board at its second end and then onto a desired location such as a bed or other furniture.

In some embodiments, the apparatus is configured to allow the transfer board to rotate around a horizontal axis at, or near, the first end of the transfer board and or outer edge of the seat. In some embodiments, the apparatus is configured to allow the transfer board to be held in place at a plurality of predetermined angles relative to the seat, i.e., around the horizontal axis. In other embodiments, the transfer board can be stabilized at any location along a predefined continuum of angles. Thus, in some embodiments, the apparatus is configured to allow for rotational movement, and the transfer board can be moved between a storage position and at least one predetermined in use position. The storage position may, for example, be vertical or substantially vertical, for example, within 10 degrees or within 5 degrees of a vertical plane perpendicular to a floor. The in use position may, for example, be within 20 degrees or within 10 degrees above or below the horizonal plane in which the seat resides. In some embodiments, the transfer board is capable of rotating from the in use position to a storage position, wherein the in use position and the storage position are between 60 degrees and 130 degrees or 75 degrees and 120 degrees apart, and optionally the storage position is vertical or within 10 degrees of vertical. In some embodiments, rotation may, for example, be accomplished by a user or a caregiver applying a physical force, e.g., grasping the transfer board at or near the second end and lifting that end away from the apparatus, thereby causing rotation.

In some embodiments, the apparatus is configured to allow the transfer board to move laterally around a portion of the outer edge of the seat. In some embodiments, the apparatus is configured to allow the transfer board to be held in place at a plurality of predetermined positions around the outer edge of a seat. When the apparatus is configured to allow for this lateral movement, the transfer board can be moved around a portion of the outer edge of the seat, e.g., having a range of 10 degrees to 120 degrees, or 30 degrees to 90 degrees, or 40 degrees to 80 degrees. In some embodiments, the apparatus is also configured to allow for lateral movement of the transfer board away from the outer edge of the seat, for example, up to 20 cm or up to 10 cm, or up to 5 cm or up to 4 cm, or up to 3 cm or up to 2 cm, or up to 1 cm away from the outer edge of the seat. Lateral movement may, for example, be accomplished by a user or caregiver grasping the transfer board at or near the second end and pulling or pushing or rotating the transfer board relative to the seat in, for example a horizontal or substantially horizontal plane.

In some embodiments, as shown in FIG. 3, the apparatus is configured to allow the transfer board 330 to move vertically. When the apparatus is configured to allow for this type of movement, the transfer board can be moved above the upper surface of the seat. This freedom of movement is beneficial because it allows for ease of placement of the transfer board. In some embodiments, the apparatus is configured to allow the transfer board to be moved to a place of up to. e.g., 30 cm above, 20 cm above, or 10 cm above the upper surface of the seat, as well as positioned at the same height as the seat. Vertical movement may, for example, be accomplished by a user or caregiving grasping the transfer board at or near the middle of the transfer board and lifting the transfer board relative to the seat.

Each of the aforementioned movements: rotational, lateral and vertical, may be done manually by a user or caregiver, or the system may be designed with sufficient motorized or electronic components that a user or caregiver can cause the movements by: control of the apparatus through a separate remote control or through a computer application on, for example, a smartphone. Further, when the apparatus is configured to allow for two or more of these types of movements, each of the types of movements may be independent, or two or more, if not all three, may be accomplished at the same time. The ability to move the transfer board in multiple dimensions is particularly advantage for flexible adjustment of the board into place near a user and optionally under a user at the second end of the transfer board.

Stabilization Mechanism

Whereas structures such as the tether impart flexibility, there may also be a stabilization mechanism to impart stability, which permits users to feel stable as they transfer to a commode or other location that has a seat. The stabilization mechanism, when used with a tethered transfer board allows for a highly desirable balance between flexibility and stability.

Figure 2:
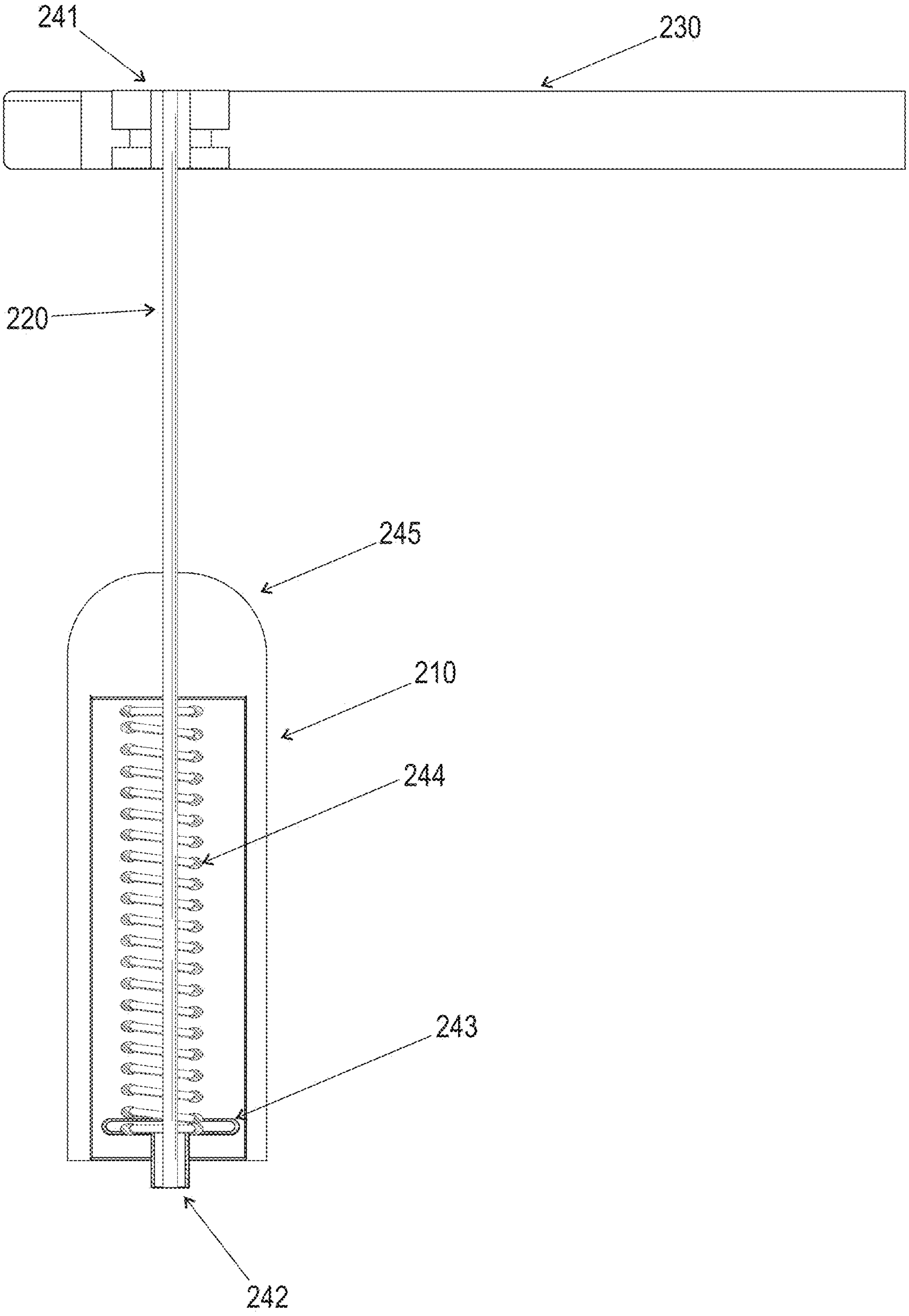
FIG. 2 is a stabilization mechanism of the present invention as attached to a transfer board.

A non-limiting example of a mechanism for stabilization is shown in FIG. 2, which is a spring embedded cylinder 210 that has a lower crimp 242, a washer 243, a spring 244, and a housing 245 that allow for the control of the direction of the spring deformation and to serve as a bearing surface to allow the tether to slide in the slot.

In one embodiment, the transfer board is pre-tensioned, e.g., about ⅛ inch spring compression, with some spring tension. In some embodiments, the spring may be compressed up to 3 inches, e.g., 0.25 inches to 3.0 inches or 0.5 inches to 2.5 inches or 1.0 inches to 2.0 inches. In some embodiments, the spring rate is perfect whereas in other embodiments, it may, e.g., be up to 30%. As persons of ordinary skill in the art will recognize, when using a longer transfer board, one may wish to use a stiffer spring in order to counter the torques.

A cord 220 may run through the spring embedded cylinder and be attached to the spring embedded cylinder. The cord may be any flexible or semiflexible material that has sufficient tensile strength, e.g., a steel cable. The other end of the cord may terminate at, or run through, the transfer board 230 and be affixed to the transfer aboard by an upper crimp 241. In some embodiments, the spring element comprises, consists essentially, or consists of a bungee style cord or a non-deforming steel cable with a spring-washer system. The non-deforming steel cable with a spring-washer system may provide a benefit of progressive resistance.

The spring embedded cylinder will hold the board in place in an in use position. When a user or caregiver wishes to move the transfer board to another position, he or she may exert a force greater than the tension force caused by the spring embedded cylinder. The system may be designed such that there is a continuum of positions in any one, two or three of the parameters not above: rotational, laterally, and vertical. Alternatively, for any one, two or all three of these parameters, there may be discrete locations for engagement within the range of possible positions, e.g., a plurality of notches in which a peg or other protrusion on the underside of the transfer board may rest and from which it may be removed or conversely, the base may have a plurality of pegs and the transfer board comprises one or more notches. For example, one may wish to include notches at one for more of the storage position, tangent to the toilet seat, and 30, 45, and or 60 degrees from the long axis of the seat, i.e., around the perimeter of the seat.

Two Transfer Boards

The aforementioned apparatuses are described as having one transfer board. Optionally, the apparatus can be designed to have two transfer boards, e.g., a first transfer board 430 and a second transfer board 431 as shown in FIG. 4. In these embodiments, the first transfer board is located near a first region of the edge of the seat, and the second transfer board is located near a second region of the edge of the seat. One of the first region and the second region is the right side edge of the seat and the other of the first region and the second region is a left side edge of the seat.

The second transfer board has a first end and a second end, wherein the first end of the second transfer board is proximate to the outer edge of the seat, and the second transfer board is capable of being moved in a manner similar to the first board, e.g., one or more, if not all, of rotationally, laterally, and vertically. In some embodiments, the second transfer board is capable of moving between an in use position and a storage position relative to the upper surface of the seat at the first end of the transfer board and the transfer board is attached (directly or through another structure such as a tether) to the base in both the in use position and the storage position. In some of these embodiments, the base comprises a first slot 460 and second slot 461, wherein each of the first slot and the second slot comprises an opening in the shape of an arc. Thus, when there are two slots, each slot may circumscribe a portion of the seat, e.g., 20 to 130 degrees or 60 to 90 degrees or 20 to 60 degrees. In other embodiments, there may be a single slot that circumscribes the left side, front and right side of the seat. Optionally, each slot may have an enlarged opening 480 at an end that allows for insertion of the stabilization mechanism. As shown in FIG. 4, that enlarged opening extends to the side wall of the housing, while the slot is in the upper surface of the housing.

Additionally, the apparatus may comprise a first cord and a second cord, wherein the first cord is thread through the first slot and the second cord is thread through the second slot. The first cord is attached to a first spring embedded cylinder, and the second cord is attached to a second spring embedded cylinder. Further, the first cord is attached to the first transfer board, and the second cord is attached to the second transfer board.

Lids

In some embodiments, the present invention is directed to a lid for a seat 110 of FIG. 1. These lids may be used in connection with the apparatuses of the present invention, or they may be used with other seats such as commode seats that are not part of the apparatuses of other embodiments of the present invention. In some embodiments, a lid is connected to a seat. In other embodiments, the lid and seat are connected to a housing. In still other embodiments, the lid is free-standing, and thus, although capable of resting on a seat, is not connected to either the seat, or the base, or any other structure.

Figure 9:
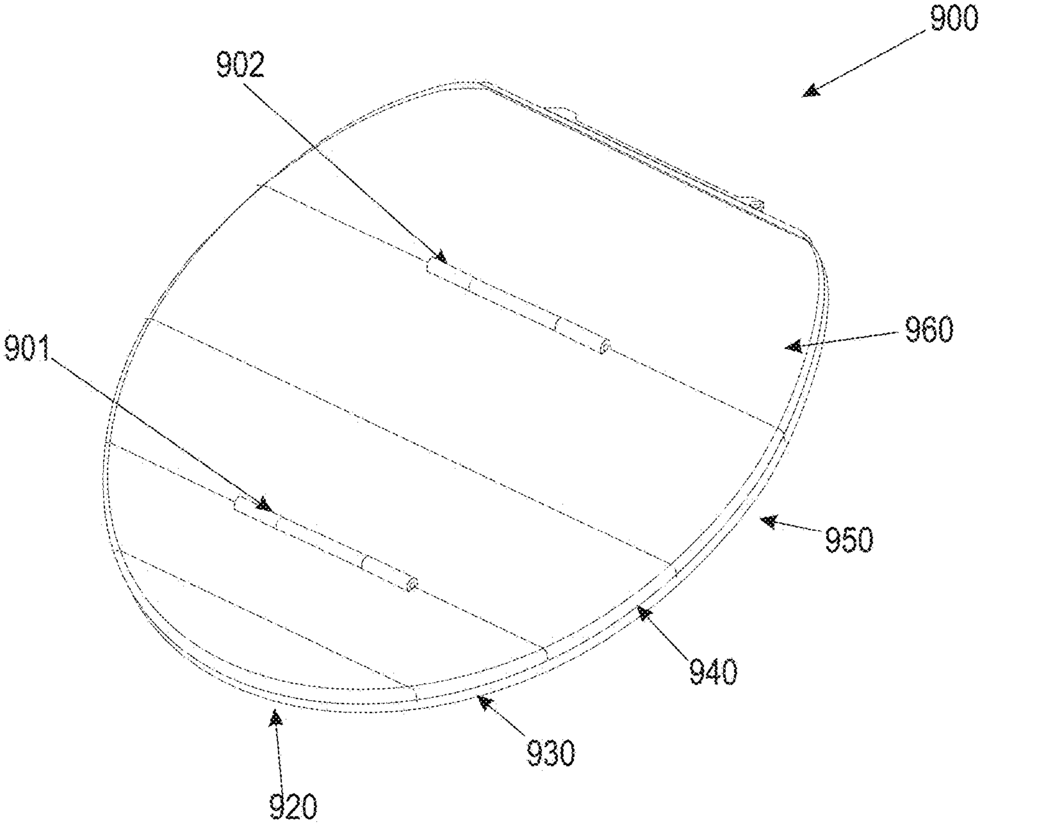
FIG. 9 is a commode lid that is unfolded.
Figure 10:
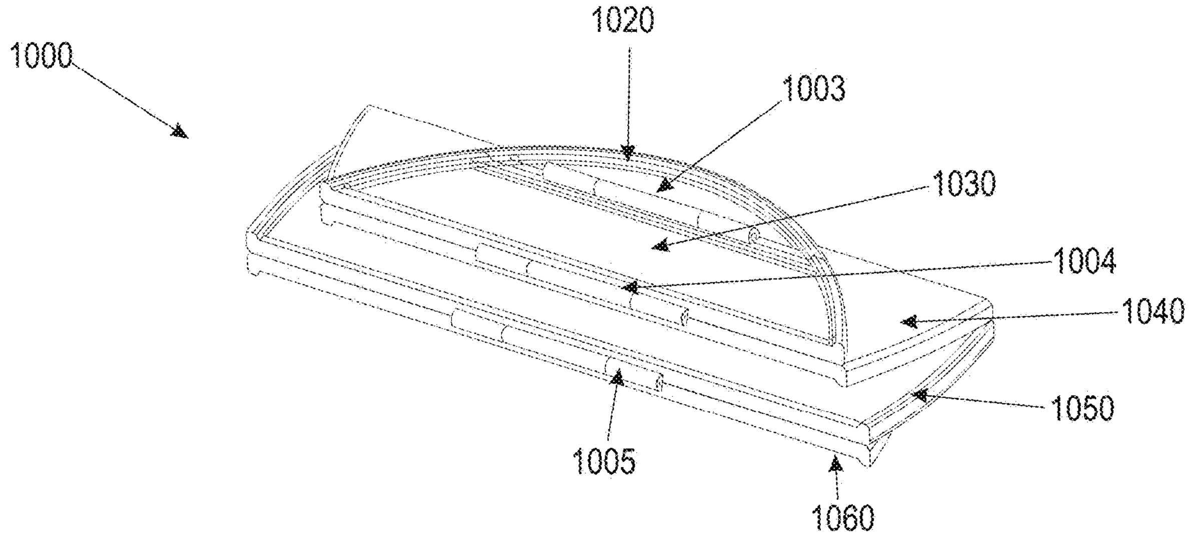
FIG. 10 is the commode lid of FIG. 9 when it is folded on itself.

These lids are configured to exist in a first position and a second position. In the first position, the lid 900 of FIG. 9 is unfolded, and may, for example, have a footprint in the shape of a toilet seat. In a second position, the lid may be folded on itself 1000 of FIG. 10. In some embodiments, when in the second position, no portion of the lid covers any of the seat, or some of the lid covers the rear portion of the seat but not any of the opening defined by the seat, or some of the lid covers both the rear portion of the seat and some of the opening defined by the seat. When a portion of the seat is covered by the folded lid in the second position, preferably it is a small enough region of the seat that the covered region does not undesirably interfere with the user's use of the seat, e.g., less than 20%, less than 10%, less than 5%, less than 3%, less than 2%, or less than 1% of the seat. When a portion of the opening that is defined by the seat is covered by the folded lid in the second position, preferably it is a small of enough region of the opening that the covered region does not undesirably interfere with the user's use of the seat, e.g., less than 20%, less than 10%, less than 5%, less than 3%, less than 2%, or less than 1% of the opening.

The lid may be comprised of, consist essentially of, or consist of a plurality of slats and hinges that enable folding. The slats may be of uniform widths, or each slat may be of a different width, e.g., increasing as one moves from one end of the lid to the other, with the largest width proximate to the location of the attachment of the lid to the seat or the base, or two or more slats may be of the same widths, while two or more are of different widths. In some embodiments, the slats have uniform thickness.

In some embodiments, the lid comprises two to eight hinges and two to eight slats. Between each pair of slats there may be a hinge, and optionally, there may also be a hinge at the rear of the lid for it to be affixed to the seat or the base or elsewhere on the apparatus. In an example shown in FIG. 9 and FIG. 10, there are five slats with rounded edges of increasing widths 920, 930, 940, 950, and 960, which are also shown as 1020, 1030, 1040, 1050 and 1060. Two hinges 901 and 902 are visible from the top, and three hinges 1003, 1004 and 1005 are visible when the seat is folded, are on the bottom. Thus, in some embodiments hinges between consecutive slats may be on alternating sides of the lid.

Figure 14:
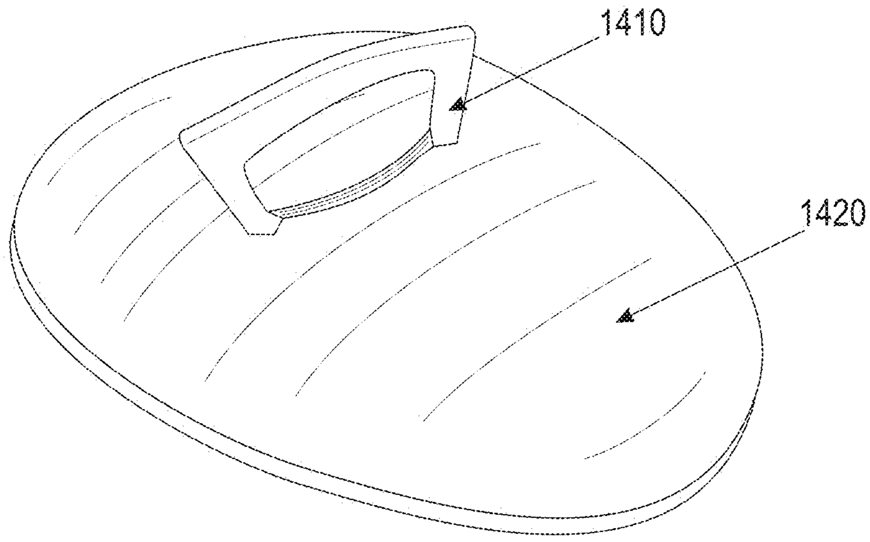
FIG. 14 is another lid of the present invention.

An alternative lid is shown in FIG. 14. The lid 1420 may be configured such that it is not foldable but contains a handle 1410. This lid may have a size and shape that allows for it to rest over the opening of the seat and over that opening. For example, it may come in contact with the rim of the seat. A lid may be advantageous because it helps to contain any smell associated with waste. The handle allows for easy lifting. Optionally, the mobile commode contains one or more hooks (not shown) on which the lid may be stored when the commode is in use. Additionally or alternatively, a tether or chain may be associated with the lid at, for example, the handle on one end and to the commode as the other end. Additionally or alternatively, this lid may be hinged to the commode and can be rotated between a horizontal and vertical position.

Wheels and Floor Stabilizers

In some embodiments, the present invention is directed to a system for moving and stabilizing a moveable apparatus such as a mobile commode. These systems may be used in connection with the apparatuses of the present invention and/or the lids described in this specification, or they may be used with other apparatuses and systems independent of the apparatuses and/or lids described above.

Figure 6:
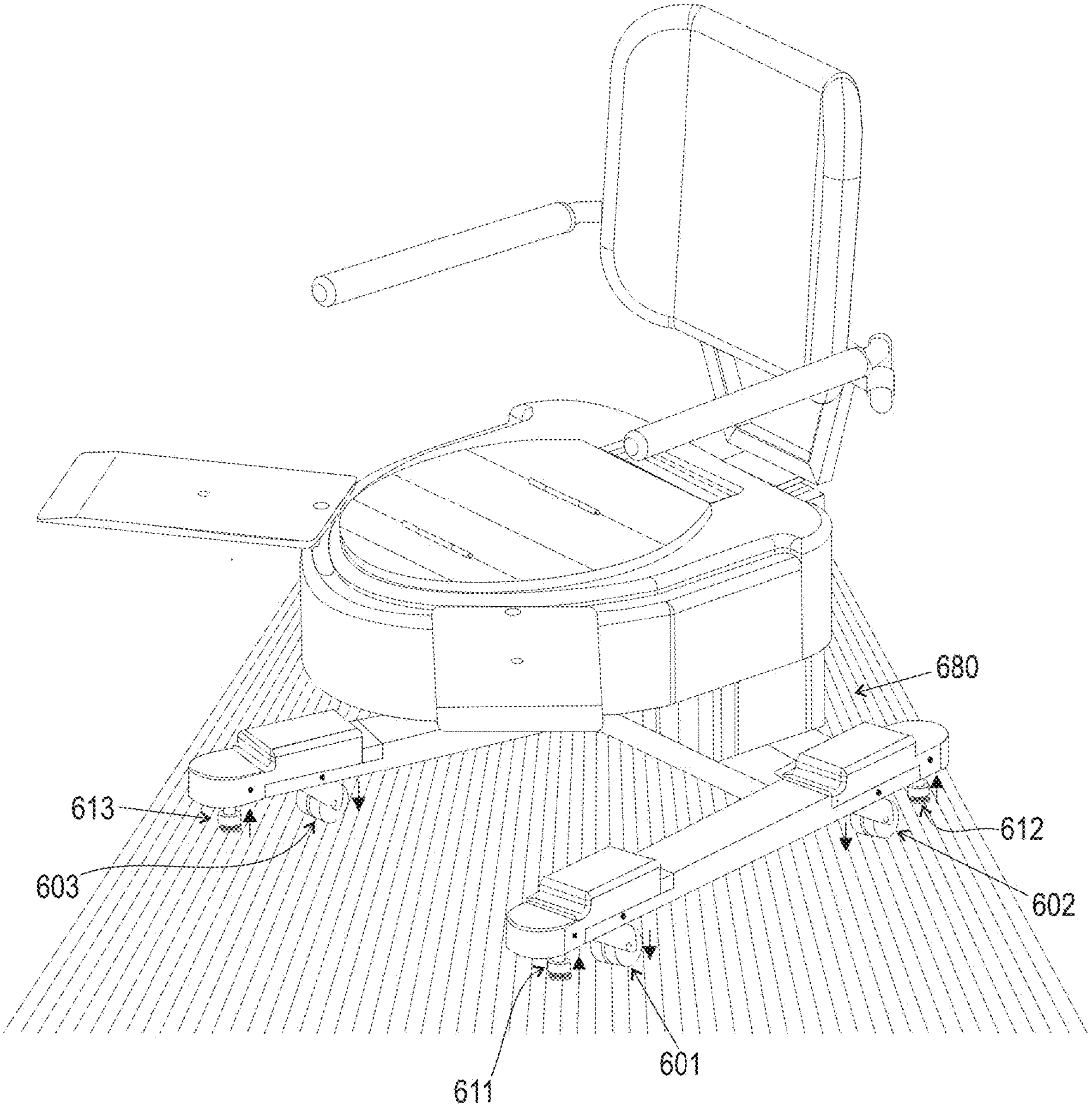
FIG. 6 is the apparatus of FIG. 5 with the base lowered.

In one embodiment, as shown in FIG. 6, the system is a mobile commode comprising a base that has a seat, a plurality of wheels 601, 602, and 603, with a fourth wheel not shown, and a plurality of floor stabilizers, 611, 612, and 613, with a fourth floor stabilizer not shown. In some embodiments, the plurality of wheels is attached to the base, and the system is configured to allow the wheels to move between an engaged position and a disengaged position. Pairs of wheels and floor stabilizers may be attached to horizontal members. For each pair of wheels and floor stabilizers one wheel and one floor stabilizer may be located at or near each end of a horizontal member. In some embodiments, a cross member attaches the two horizontal members at or near their rear ends. The cross member may, for example, also be attached to base.

Figure 7:
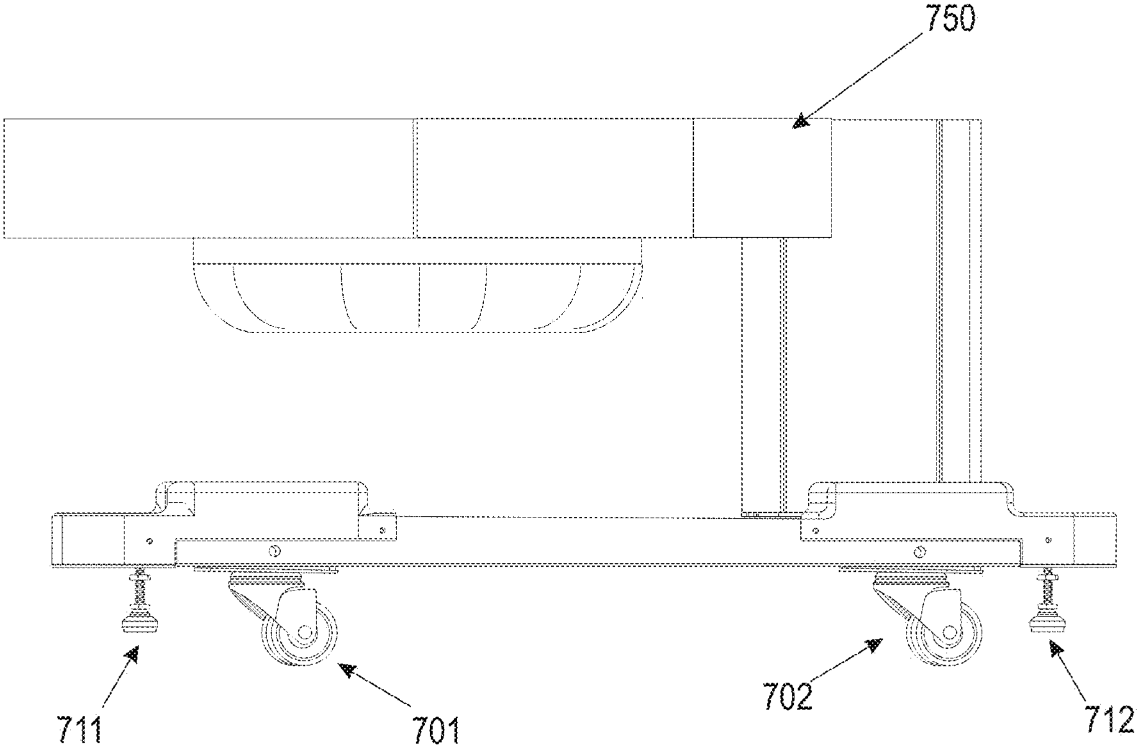
FIG. 7 is a closeup of the lower portion of the apparatus of FIG. 6 with the base lowered.
Figure 8:
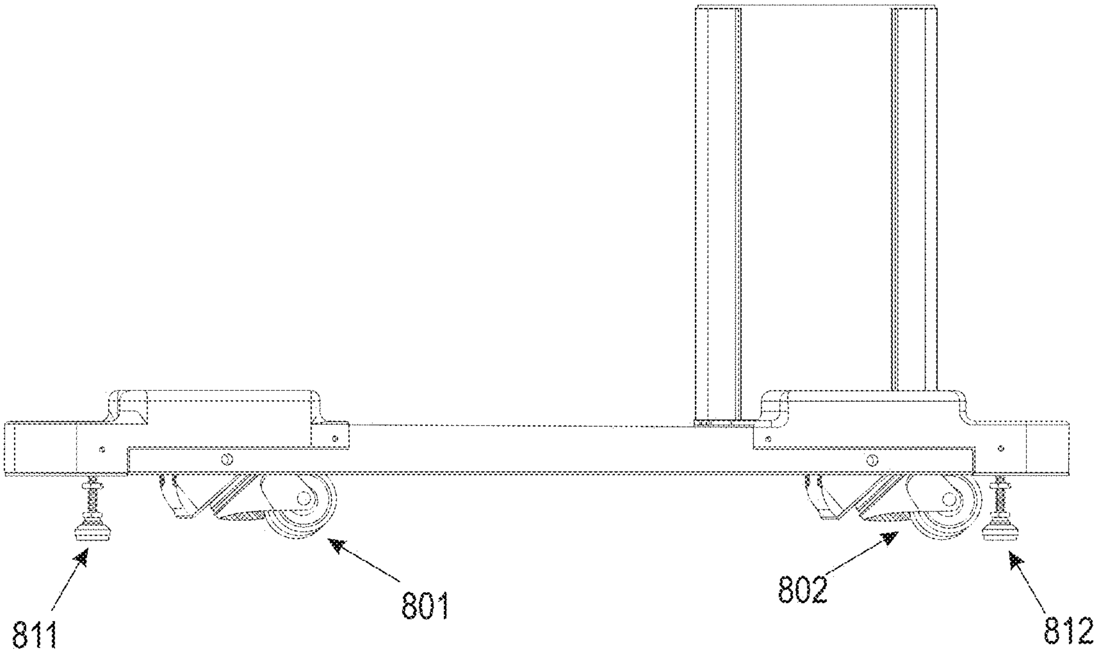
FIG. 8 is a closeup of the lower portion of the apparatus of FIG. 6 with the base elevated and wheels retracted.

The engaged position is shown in FIG. 7. There, wheels 701 and 702 are each in a position to be in contact with the floor. In the disengaged position, as shown in FIG. 8, wheels 801 and 802 are retracted and not in a position to contact the floor. The wheels may, for example, be attached to legs or the base through e.g., retractable casters. Although only one pair of wheels is shown in each of FIG. 7 and FIG. 8, the apparatus may have two pairs of wheels with this configuration.

Further, the system may be configured to allow the floor stabilizers (also referred to as feet) to move between a first position and a second position relative to the floor. When in the second position, the floor stabilizers 711 and 712 are not in a position to contact the floor, and when in the first position, the floor stabilizers 811 and 812 are in a position to contact the floor. Further, when the floor stabilizers are in the first position, the wheels are in the disengaged position, and wherein when the floor stabilizers are in the second position, the wheels are in the engaged position. In some embodiments, the height of the floor stabilizer does not change but a space is introduced between them and the floor when the wheels move from a retracted to extended position.

In contrast to FIG. 7 and FIG. 8, FIG. 16 and FIG. 17, which for illustrative purposes show the relationship between only one wheel and one floor stabilizer, show embodiments in which the wheel 1601, 1701, does not retract, but the floor stabilizer is capable of moving from a retracted position 1611 to a position in which it is engaged with the floor 1711. Thus, the height of floor stabilizer changes. Although only one wheel is shown, all floor stabilizers, e.g., four floor stabilizers would move in unison relative to all, e.g., four, wheels.

As described above, in some embodiments, the floor stabilizers may be designed such that they have a fixed size and shape. Thus, as the wheels move between engaged and disengaged positions, the floor stabilizers do not change position or size relative to the base, but their location relative to the floor changes. In other embodiments, the floor stabilizers may be designed such that they change their size and/or shape. Thus, as the wheels move from between an engaged and disengaged position, the floor stabilizers do change position or size, e.g., by extending from a telescoped or otherwise retracted position, which changes their location relative to the floor.

In some embodiments, the base is capable of moving between a first height to a second height, and optionally one or more intermediate heights that may or may not be predetermined. This movement is distinct from the movement of the wheels and/or floor stabilizers and optionally may be accomplished in coordination with or independent of movement by either the wheels and or floor stabilizers.

In some embodiments, the base contains a vertical lift column and/or two or more telescoping members (also referred to as nesting members) that allow for it to change size. The telescoping members may be coupled to the wheels such that extension of the base causes retraction of the wheels and/or extension of the floor stabilizers. Movement between these positions may, for example, be controlled by manual means, electronic means or a combination thereof. In some embodiments, there is cabling and a telescope drive motor and/or a gear system. In other embodiments, the vertical lift is controlled by hydraulics. For example, there may be an hydraulic actuator with a reservoir, a pump, and a cylinder that is controlled by either a small electric pump and a switch or a manual control.

The ability of the apparatus to lift and lower allows users and caregivers to take advantage of gravity. Thus, when a user moves onto an apparatus, the apparatus may, for example, be lower than the structure from which the user is transferring and when the user is moving from the apparatus to another location such as a bed, the apparatus may be raised so that it is higher than the other structure. Alternatively, a level transfer can be created between two even heights, wherein a user would slide across the transfer board but not take advantage of gravity.

Figure 5:
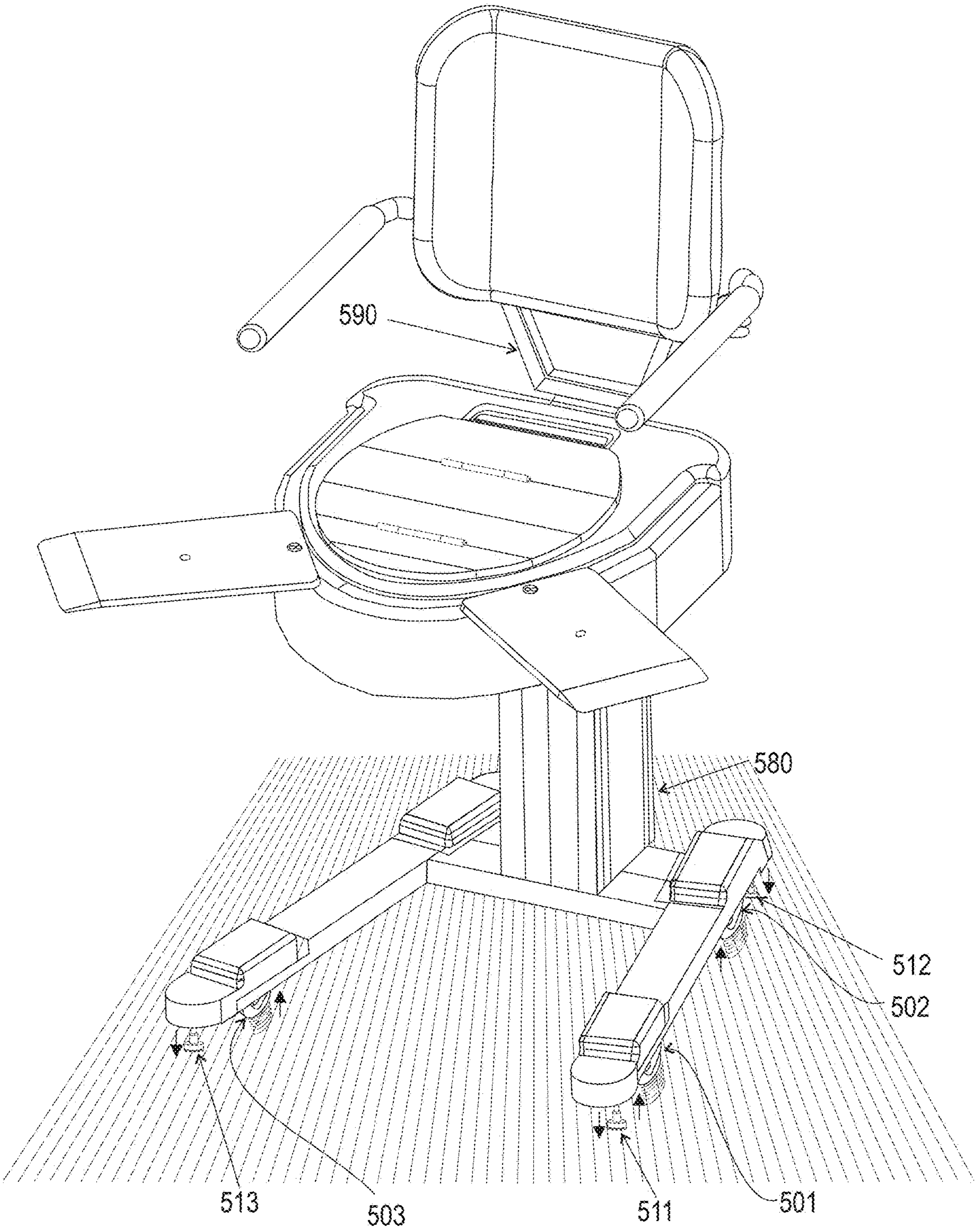
FIG. 5 is a mobile apparatus of the present invention with two transfer boards.

For example, the base may comprise a telescoping pedestal. When the base is at the first height, the wheels are in an engaged position and when the base is at the second height, which is higher than the first height, by for example, 10 cm to 40 cm, or 20 cm to 30 cm, the wheels may be in a disengaged position. The movement between the two heights may be illustrated by comparing FIG. 5 to FIG. 6. In FIG. 5, the apparatus is raised, and thus, at an in use height; the base 580 is configured to be at an extended height. By contrast, the base 680, in FIG. 6, is collapsed, and thus, shows the apparatus in a storage or transport mode. For further comparison, in FIG. 5, wheels 501, 502, and 503 are retracted, and thus, the foot stabilizers 511, 512, and 513 have bottom edges that are lower than the wheels so that the apparatus is stable. By contrast, in FIG. 6, wheels 601, 602 and 603 are not retracted, and thus, the wheels extend lower than the floor stabilizers thereby enabling the apparatus to easily be moved, e.g., rolled. In the embodiments of FIGS. 5 and 6, there are a fourth wheel and fourth floor stabilizer that are not shown.

In some embodiments, the apparatus has a transport or storage mode, wherein the seat is at a first height, which is its lowest height. When in the in use mode, the apparatus may have the seat at a second height, which is higher than the first height. In some embodiments, the second height is a single discrete height. In other embodiments, the in use height is a range of heights all of which are higher than the first height. By having a range of in use heights, the apparatus can be used both to transfer to and from locations that are of a variety of heights and to make use of gravity when a user transfers on and off of the apparatus.

Figure 18:
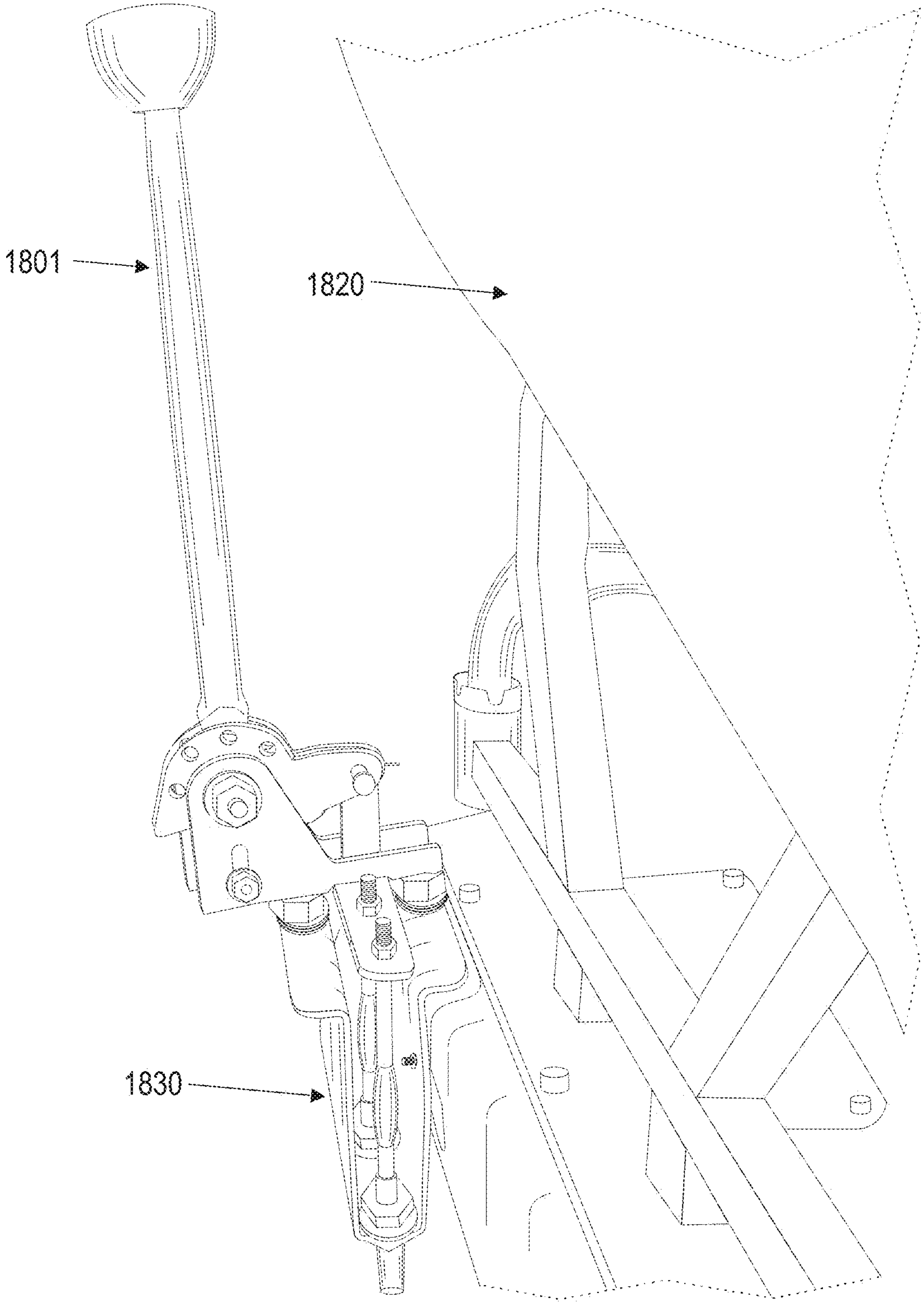
FIG. 18 shows a lever for moving a floor stabilizer between the two positions shown in FIG. 16 and FIG. 17.

In some embodiments, there may be a deployable foot caster system. Each foot caster (for example, in a set of four or six or eight foot casters) is connected to the same single lever using push-pull cables. The apparatus may be designed such that a pull of a lever raises the device onto the feet (floor stabilizers), thereby locking it in place, while a push of the lever releases the casters, thereby stopping them from impeding movement. Optionally, as the device is raised onto its feet, the base may also be raised so that the seat is in a useable position. As shown in FIG. 18, the lever 1801 may, for example, be located at the rear of the device behind the backrest for the seat 1820 and stabilizers. The lever may be moved by a caregiver between two positions that allow the floor stabilizers to move between being into contact with and disassociated from the floor and optionally is configured to change the height of the seat at the same time. Also optionally, there may be a foot release (not shown) that needs to be activated to move the lever from one position to another position. By including a foot release, one is able to reduce the risk that the lever will unintentionally be moved between the two positions. In this configuration, a caregiver would engage the foot release and lever at the same time.

Alternatively, or additionally, the mobile commode may contain electronic equipment that allows for control of the deployable foot caster system and or raising of the seat. In this automated system, either the mobile commode itself would have a button, switch or other activation system that causes the commode to move between positions, or there may be a computer app that wirelessly (or by wired communication) allows for this control employing a microprocessor and programming or alternatively there is a non-programmable circuit.

Figure 15:
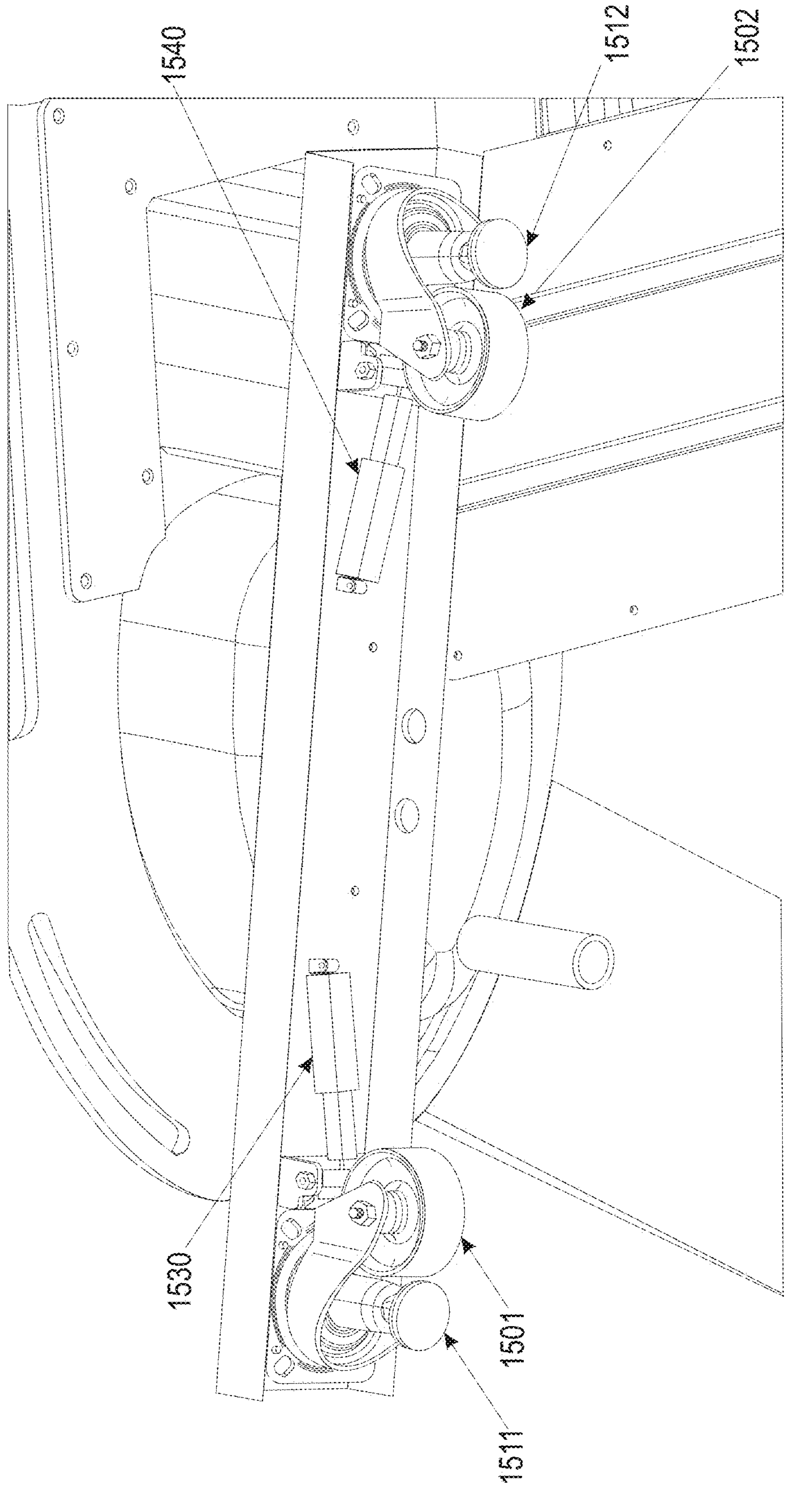
FIG. 15 is an illustration of the configuration of wheels and floor stabilizers that are connected to the same horizontal member.
Figure 16:
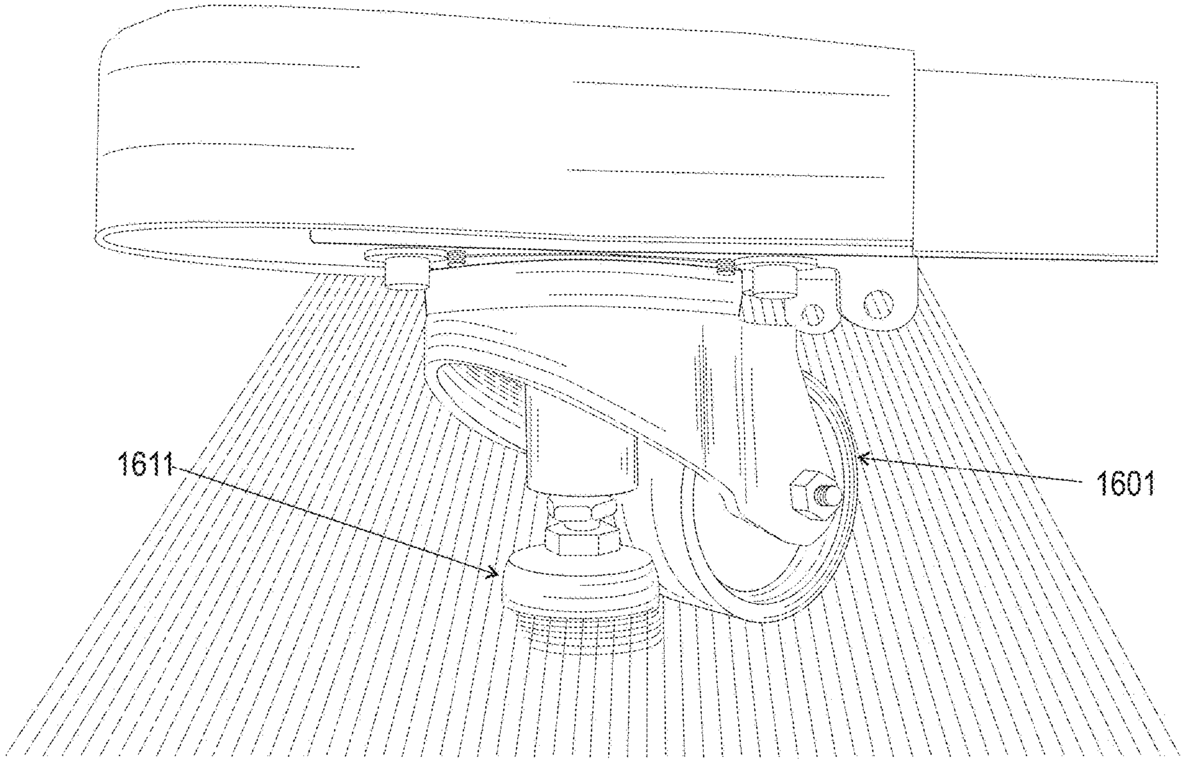
FIG. 16 shows a wheel in contact with a floor and a floor stabilizer not in contact with the floor.
Figure 17:
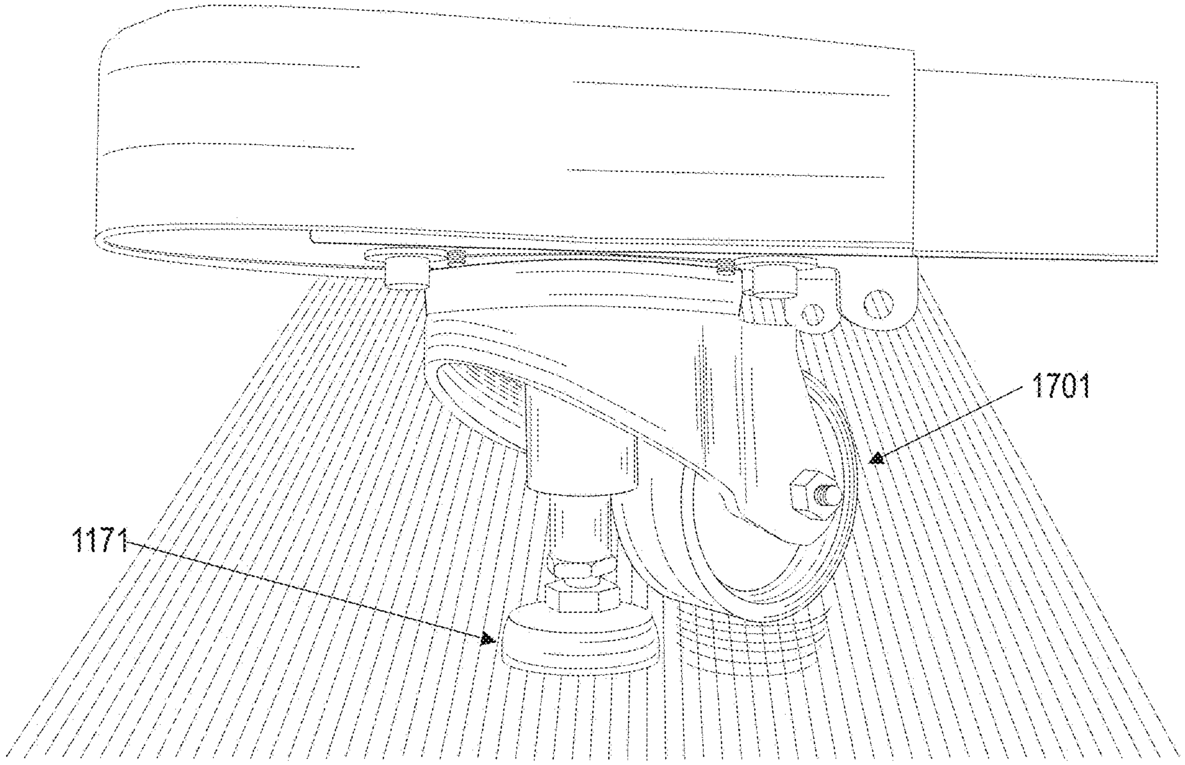
FIG. 17 shows both a wheel and a floor stabilizer in contact with a floor.

In some embodiments, for actuator deployment of the feet of the apparatus, center foot deployable casters are utilized, the elements of which are shown in FIG. 15. This caster works by moving a linkage attached to a bearing that when pushed forward, drives each caster foot down. When the linkage is pulled to the rear, the caster foot is retracted. Casters are commercially available from sources such as the HRLK series from Blickle USA. A push-pull cable may be used to manually actuate this linkage. This feature, when present, may be in addition to the leveling feet.

For the electric actuator deployment of the foot, the push-pull cable may be replaced with an electric actuator with a 1" stroke with integrated limit stops at either end of travel. In some embodiments, one may use commercially available electric leadscrew actuators that when they reach their end of mechanical travel (in either direction), the mechanism simultaneously depresses a switch internal to the actuator, opening up the circuit. In these devices, the motor can only be spun in the opposite direction by the controller when the actuator is in this mechanical position. Four actuators may be used to interface with the four casters. The four actuators are wired together so they can be controlled simultaneously with a two-position switch. If the switch is active in the first position, the actuator will push toward the caster, lifting the device onto its feet 1511, 1512 (two of which are shown in the figure, though the system may also have another pair of feet, casters and actuators) and when it reaches the end of its travel, the internal limit switch will open the circuit (stopping actuator motion). If the switch is moved to its second position, each actuator 1530, 1540 will pull away from the caster (which may be secured to a C-channel frame), lowering the device onto the caster wheels 1501, 1502 (two of which are shown). The motion will continue until the actuators reach their outer limit stop, opening the circuit (stopping the actuator motion). The two-position switch can be user controlled, allowing the user to deploy the feet at any position of the vertical lift actuator, or it could be mechanically coupled to the motion of the vertical lift actuator so that the feet are deployed when the vertical lift actuator is in its lowest position only. Additionally, these modalities of control may be placed parallel to it to allow for the feet to be deployed at their lowest position and spontaneously be controlled by the user in all other positions.

In some embodiments there are separate switches for user control of the foot deployment/foot retraction and the vertical lift. In some embodiments, the switches for the foot deployment/foot retraction are located in the pendant housing with the vertical lift switches.

Further, in some embodiments, the casters can be locked. Locking of the casters can be accomplished manually (e.g., through a foot activated mechanism) or through an automated system such that when floor stabilizers are activated, the casters are locked. When a locking feature is present, it may, for example, be located on all casters or only some of the casters, for example, the one or two rear casters.

In some embodiments, wheel mobility is restricted to when the apparatus is in a mobile mode, which may correspond to when it is at its most compact and the seat and any housing are at their lowest heights. Thus, when the apparatus is at its desired location the wheels are manually or electronically disengaged from the floor or otherwise render unable to allow for movement of the apparatus while the stabilizers engage the floor. The apparatus may be designed such that the seat can only be raised to an in use height after movement along the floor by the wheels has been prevented.

Optionally, there may also be an autoswitch, wherein the autoswitch causes the wheels to cease being engaged and capable of moving the apparatus a fixed amount of time after the autoswitch is activated. In some embodiments, the fixed amount of time is 30 seconds-2 minutes after the seat is raised to an in use height. After expiration of the fixed amount of time, the autoswitch and electronics, pulleys, and or gears or other structures associated with it, automatically cause the wheels to disengage, making the apparatus immobile again. In some embodiments, the autoswitch may be activated by voice command or pushing on switch, with an alert light that stays on or a voice reminding a user or caregiver that the wheels are engaged. Although the autoswitch needs to be activated, it will automatically deactivate, thereby balancing flexibility that a user or caregiver may want because the location of an apparatus might need to be further adjusted even after it is put proximate to a user, with safety, to prevent further movement after the location is adjusted without activation or deactivation by a user.

Methods of Use

Various embodiments of the present invention provide methods for transferring to a seat. One method comprises moving a transfer board from a storage position to an in use position, wherein the transfer board is part of an apparatus or system of the present invention. The apparatus comprises a base, a transfer board, a tether, and a stabilization mechanism. The base comprises a seat, wherein the seat has an upper surface and the upper surface of the seat has an outer edge. The transfer board has a first end and a second end, wherein the first end of the transfer board is proximate to the outer edge of the seat, and the transfer board is capable of rotating relative to the seat at, or near, the first end of the transfer board. The stabilization mechanism allows for the transfer board to be held in place at the in use position.

Optionally, a user or a caregiver may position the apparatus at a first location, such as next to a bed. Prior to positioning the apparatus, the transfer board or transfer boards, if there are two, may be in a storage position, e.g., oriented vertically. Movement may be made by exerting a physical force, e.g., by pushing or pulling the apparatus into place or by remote control through, e.g., the use of a computer app that is in wired or wireless communication with an apparatus that comprises a controllable motor.

When the apparatus is positioned at the desired location, through, for example, the use of wheels, if present, a user or a caregiver may cause the foot stabilizers to come into contact with the floor, rotate the transfer board and, optionally, lift it vertically and/or slide it laterally into a desired position. The desired position is, for example, adjacent to the user with the first end of the transfer board lined up with the seat and the second end of the transfer board resting on the surface of where the user is located e.g., a bed. When the transfer board is positioned in the desired location, release of the board will, due to the stabilization mechanism, be held in place.

A user may then move along the transfer board to the seat. If the seat is a mobile commode, the user may use it as such, depositing waste in a receptacle that is contained in the housing. To use the transfer board in order to access a seat, a user causes himself of herself, or a caregiver causes the user, to move along the transfer board from the second end of the transfer board to the first end of the transfer board. Next, the user causes himself or herself or the caregiver causes the user to move from the first end of the transfer board to the seat.

In order to return from the seat, the user causes himself or herself, or the caregiver causes the user to move to the first end of the transfer board from the seat. Next, the user causes himself or herself, or the caregiver causes the user to move along the transfer board from the first end of the transfer board to the second end of the transfer board and then off of the transfer board. The user or caregiver may then move the transfer board to a storage position.

Optionally, the apparatus has a lift, such as a scissors lift, that can cause the seat to be raised or lowered while the apparatus is in an in use position, i.e., if wheels are present, they are locked or retracted. By being able to raise and lower the seat, the user can take advantage of gravity when moving off of the seat or onto the seat. When moving from, for example, a bed to the seat, one may wish for the seat to be lower than the bed. Conversely, when moving from, for example, the seat to a bed, one may wish for the bed to be lower than the seat. In some embodiments, there is a height adjustment mechanism, such as a scissors mechanism, that optionally is configured to be controlled wirelessly. In some embodiments, this height adjustment feature allows for a range of in use heights between approximately 35 cm and 80 cm or 40 cm and 60 cm.

For illustrative purposes, many of the embodiments are described as being apparatuses that are mobile commodes. However, within the scope of the invention are commodes that are not mobile, e.g., stationary toilets that may be located in bathrooms or at other locations, e.g., free standing structure at festivals and sporting events, or other sitting locations such as chairs, as well as wheelchairs, stretchers and other devices that may be used for transportation that have a tethered transfer board and a stabilization mechanism to allow for semi-independent and independent transfers between any set of seated surfaces.

Further, in some embodiments, when a user wishes to use an apparatus such as a commode, the apparatus can be summoned by a control operated by the user or a caregiver. The apparatus may travel in 360 degrees of rotation and motion in an omni directional mode. A control sends an incoming signal to a signal-receiving unit in the apparatus to start movement towards a location such as a bed at an in use position. A homing device finder seeks a homing device at the location e.g., on the bed. Movable members such as lift members can alter the height of the apparatus, e.g., expand or retract to raise or to lower the commode to the level of the bed. If the seat is covered, the lid is opened and any arms if present may move or be moved out of the way, e.g., drop or move upward and optionally outward. If a transfer board is present, it may be put into position and the user may move or be moved along it to the seat.

What is claimed is:

1. An apparatus comprising:

(a) a base, wherein the base comprises a seat and a slot, wherein the seat has an upper surface and the upper surface of the seat has an outer edge;

(b) a transfer board, wherein the transfer board has a first end and a second end, wherein the first end is proximate to the outer edge of the seat, and the transfer board is capable of being moved between an in use position and a storage position by rotating the transfer board relative to the upper surface of the seat around a horizontal axis at or near the first end of the transfer board; and (c) a cord or rope, wherein the cord or rope is threaded through the slot, wherein the cord or rope tethers the transfer board to the base at or near the first end of the transfer board and the transfer board is tethered to the base in both the in use position and the storage position through the cord or rope.

2. The apparatus of claim 1, wherein the apparatus is configured to allow for at least one of: (i) the transfer board to be held in place at a plurality of angles relative to the outer edge of the seat; (ii) the transfer board to move laterally around a portion of the outer edge of the seat; and (iii) the transfer board to be held in place at a plurality of locations around the portion of the outer edge of the seat.

3. The apparatus of claim 1, wherein the seat is capable of moving between a plurality of heights relative to a floor.

4. The apparatus of claim 1, wherein the slot comprises an opening, wherein the opening is curved and the cord or rope is threaded through the opening in the slot.

5. The apparatus of claim 1, wherein the apparatus further comprises a spring embedded cylinder, wherein the spring embedded cylinder is attached to the cord or rope.

6. The apparatus of claim 1, wherein the seat is a toilet seat.

7. The apparatus of claim 6, wherein the seat is part of a commode.

8. The apparatus of claim 7, wherein the commode is height adjustable.

9. The apparatus of claim 1, wherein the base is part of a wheelchair.

10. The apparatus of claim 1 further comprising a plurality of wheels.

11. The apparatus of claim 10, wherein the apparatus is configured to allow the wheels to move between an engaged position and a disengaged position.

12. The apparatus of claim 11, wherein in the engaged position, the wheels contact a floor and in the disengaged position, the wheels do not contact the floor.

13. The apparatus of claim 12 further comprising a plurality of floor stabilizers.

14. The apparatus of claim 13, wherein the apparatus is configured to allow the floor stabilizers to move between a first position and a second position.

15. The apparatus of claim 14, wherein when in the second position, the floor stabilizers contact the floor and when in the first position, the floor stabilizers do not contact the floor.

16. The apparatus of claim 15, wherein when the floor stabilizers are in the second position, the wheels are in the disengaged position.

17. The apparatus of claim 16, wherein when the floor stabilizers are in the first position, the wheels are in the engaged position.

18. The apparatus of claim 17, wherein the base is capable of moving from a first height to a second height, wherein when the base is at the first height, the wheels are in an engaged position, and when the base is at the second height, the wheels are in a disengaged position.

19. The apparatus of claim 11 further comprising an autoswitch, wherein the autoswitch causes the wheels to cease being engaged and capable of moving the apparatus a fixed amount of time after the autoswitch is activated.

* * * * *